(12) United States Patent
Fortin et al.

(10) Patent No.: US 11,356,304 B1
(45) Date of Patent: Jun. 7, 2022

(54) QUARTER-RATE DATA SAMPLING WITH LOOP-UNROLLED DECISION FEEDBACK EQUALIZATION

(71) Applicant: Cadence Design Systems, Inc., San Jose, CA (US)

(72) Inventors: Guillaume Fortin, Montréal (CA); Jean-Francois Delage, Montréal (CA); Louis-Francois Tanguay, Montréal (CA); Mathieu Gagnon, Montréal (CA)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/305,576

(22) Filed: Jul. 9, 2021

(51) Int. Cl.
*H04L 25/03* (2006.01)

(52) U.S. Cl.
CPC .. *H04L 25/03057* (2013.01); *H04L 25/03267* (2013.01); *H04L 25/03949* (2013.01)

(58) Field of Classification Search
CPC ......... H04L 25/03006; H04L 25/03019; H04L 25/03057; H04L 25/03108; H04L 25/03267; H04L 25/03949; H04L 25/06

USPC .............. 375/232, 233, 235, 346, 348, 349; 333/28 R; 708/322, 323

See application file for complete search history.

(56) References Cited

U.S. PATENT DOCUMENTS

| | | | |
|---|---|---|---|
| 9,571,309 B1* | 2/2017 | Sakai | H04L 25/03006 |
| 9,742,597 B1* | 8/2017 | Chang | H04L 25/03885 |
| 9,900,121 B1* | 2/2018 | Takatori | H04L 25/03057 |
| 2016/0301548 A1* | 10/2016 | Musah | H04L 7/0058 |
| 2018/0097665 A1* | 4/2018 | Li | H04L 25/03885 |
| 2019/0198068 A1* | 6/2019 | Sreeramaneni | G11C 29/022 |
| 2020/0358590 A1* | 11/2020 | Kim | H04L 7/0045 |

* cited by examiner

*Primary Examiner* — Young T. Tse
(74) *Attorney, Agent, or Firm* — Schwegman Lundberg & Woessner, P.A.

(57) ABSTRACT

Various embodiments provide for quarter-rate data sampling with loop-unrolled decision feedback equalization (DFE) that uses a two-summer (e.g., two-summing node) approach. For example, some embodiments provide for quarter-rate data sampling comprising a plurality of unrolled first-tap DFE loops, and two summers and a two-to-one multiplexer for each of the other tap loops used for direct feedback (e.g., second tap, third tap, fourth tap, etc.)

20 Claims, 13 Drawing Sheets

US 11,356,304 B1

QUARTER-RATE DATA SAMPLING WITH LOOP-UNROLLED DECISION FEEDBACK EQUALIZATION

TECHNICAL FIELD

Embodiments described herein relate to circuits and, more particularly, to quarter-rate data sampling with loop-unrolled decision feedback equalization.

BACKGROUND

Serial data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments can lead to transmission errors. The quality of a channel can determine an upper limit on its achievable rate. Additionally, other impairments in a serial data link can degrade overall system performance. For instance, circuit non-idealities can also cause a degradation in a system's performance. Overall, minimizing impairments can enable a channel to reach or achieve higher link rates.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
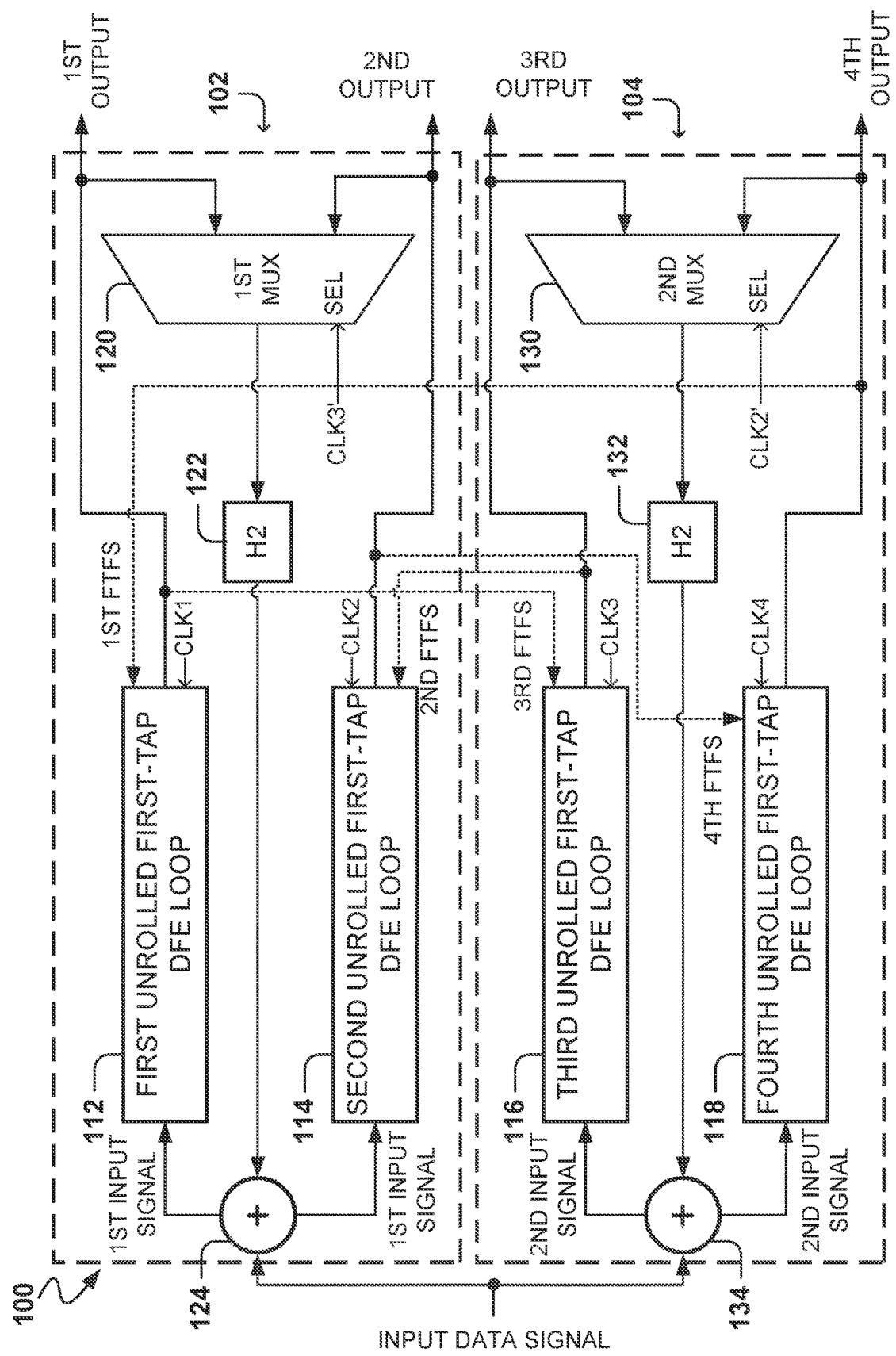
FIGS. 1 through 4 are schematics illustrating example circuits for quarter-rate data sampling with loop-unrolled decision feedback equalization, in accordance with various embodiments.

Various embodiments provide for quarter-rate data sampling with loop-unrolled decision feedback equalization. For some embodiments, the quarter-rate data sampling described herein can be part of a circuit for high speed serial data communication, such as a serializer/deserializer (SerDes) circuit.

Traditionally, a data receiver comprises data comparators, clock comparators, and error comparators, each of which uses a circuit to sample a received data signal. Both data comparators and clock comparators can be used to quickly and reliably sample a received data signal. For example, a data comparator can sample the eye of a received data signal at its center and recover a data stream. For a circuit using a loop-unrolled Decision Feedback Equalizer (DFE) (also referred to as an unrolled DFE), at least two data comparators operating at different threshold voltage values can be used. A clock comparator, which can sample the eye at its edges, may be used to perform clock recovery and alignment at the data receiver. In contrast, an error comparator is often used to measure the eye shape for diagnostic purposes or to position a data sampler at the best sampling location using a servo loop. A conventional error comparator is usually able to sample any point in the eye. An error comparator typically uses a data sampler that has a large threshold voltage range (e.g., one that can cover for the sum of random offsets, target threshold voltage, and first tap value; voltage range can reach 300-400 mV peak differential).

As data rates increase between a data transmitter and a data receiver, bit duration (also referred to as a unit interval or UI) gets smaller; and smaller UIs reduce allowed timing errors within a data receiver. Higher data rates also means that overall, a data receiver has to perform operations faster. Half-rate and quarter-rate data sampling (by a data sampler) can be used to reduce speed requirements of the clocking generation and distribution inside a receiver. For example, in a half-rate data receiver, two clock signals spaced 180° apart can be used, where each clock signal's rising edge causes sampling of one incoming bit from a received data signal. Usually, for a half-rate data receiver, twice as many clock signals running at half the line rate speed are required. In comparison, in a quarter-rate data receiver, four clock signals spaced 90° apart can be used, where each clock signal's rising edge causes sampling of one incoming bit from a received data signal. Usually, for a quarter-rate data receiver, four times as many clock signals running at a quarter of the line rate speed are required. Additionally, another set of complementary clock signals in quadrature can be used to sample transitions (e.g., detect edges). A quarter-rate data receiver is often used for high rate data links, such as those operating at 32 Gbps.

Conventional data receivers are known to use a DFE (which is a non-linear equalizer) to compensate for inter-symbol interface (ISI) present within a received data signal (e.g., received from a data transmitter). Specifically, a DFE can use a data sampler to determine (e.g., make a decision on) a value of an incoming bit of a received data signal (e.g., thereby quantizing the received data signal) for a current UI, can obtain a value of a preceding bit (e.g., value of bit from one UI before) via a first tap of the DFE, can scale the value of the preceding bit by a coefficient (e.g., tap weight)

associated with the first tap, and can apply the scaled value to a next incoming bit of the received signal by adding the scaled value to, or subtracting the scaled value from, the received signal via an analog summer. Generally, where only DFE-based equalization is used at a data receiver, the one or more tap weights (associated with the different taps) of the DFE would equal the non-equalized channel pulse response values for the incoming data signal (e.g., [a1, a2, . . . an]).

In conventional data receivers that use a direct-feedback DFE, a first tap of the DFE is expected to settle within one UI (which can represent one-bit period). However, at high data rates, closing the timing of a first tap of the DFE (with direct feedback) is usually not possible. For instance, at a data rate of 32 Gpbs, operations of a data sampler of a DFE, a feedback tap-weighting component of the DFE, and an analog summer (e.g., summing node) of the DFE should settle within 31.25 ps (which represents one UI for a data link rated at 32 Gpbs) for the DFE to properly operate. Given that current fabrication technologies do not enable a DFE to meet such a timing requirement (e.g., a UI of 31.25 ps is too small to permit a DFE to feedback and add/subtract ISI to a next bit of the received data signal), conventional data receivers often use a DFE with tap loop unrolling. For example, the loop of the first tap of a one-tap DFE can be "unrolled" such that the feedback tap-weight component and analog summer are replaced with a multiplexer (MUX) and two different data samplers (with different threshold voltages) are used to pre-compute two possibilities for the incoming bit of the received data signal at a current UI. Depending on the implementation, more than one tap loop of a DFE can be unrolled, with the number of data samplers increasing exponentially based on the number of unrolled taps (e.g., $2^N$, where N represents the number tap loops unrolled).

As noted, conventional data receivers can operate at half or a quarter of a bit rate. For instance, clock recovery circuits within conventional data receivers generate sampling clock signals used by a DFE. Some clock recovery circuits generate many sampling phases and, as such, this makes them suitable for quarter-rate applications that include a quarter-rate DFE. One of the issues with conventional quarter-rate DFEs is that they multiplex the output of the four data sampling heads into a single data stream to perform the current feedback. At high data rates, this multiplexing operation eats up timing margins needed to perform feedback of the tap currents of the DFE. Another issue with conventional quarter-rate DFEs is that they generally use twice as many data samplers as conventional half-rate DFEs, which also increases capacitive loading observed by summer (e.g., summing nodes) within the conventional DFEs. This issue is further exacerbated by the fact that clock recovery using a quarter-rate DFE involves sampling an incoming data signal using four data samplers to acquire data at center of data bits, and using another set of four data samplers to identify where bit transitions (e.g., edges) exist; this doubles the number of data samplers needed, further increasing the load on a summer. Further, at higher data rates (e.g., above 16 Gbps), achieving direct feedback for a first DFE tap can be difficult as the propagation delay around the DFE loop would need to be smaller than a single UI to operate appropriately. Furthermore, a conventional half-rate two-tap DFE with a first tap unrolled can still run into timing limitations at high data rates, such as 32 Gbps. In particular, for such a conventional DFE, applying feedback based on the first tap would need to settle within one UI period (e.g., 31.25 ps), and applying feedback based on the second tap would need to settle within two UI periods (e.g., 62.5 ps), which can entail the first tap selection value arriving not much later than one UI after the previous bit gets sampled; any extra delay in that sense can reduce the effective time allowed for the second tap to settle. With the first tap unrolled, the second tap can be the one that takes the most time to settle because it directly depends on sampler resolution time (e.g., data sampler propagation delay usually eats up most of a tap settling timing budget, and is exponentially proportional to voltage overdrive at the data samplers' input). Unfortunately, such timing can be difficult to achieve by conventional data receivers. A similar issue exists for conventional quarter-rate multi-tap DFEs that use a first tap unrolled, as four-to-one multiplexing operation would be used, which puts even more strain on loop timing closure.

Yet another issue with conventional quarter-rate DFEs is that using direct feedback DFE can interfere with the clock recovery mechanism. For instance, the first tap compensation applied should be different for data samplers used for edge detection and data samplers used for data recovery, as generally data samplers used for data samples and edge samples do not have the same ISI correction needs, as they do not sample the eye at the same position. This can be difficult to implement with direct feedback DFE as it would require different correction voltages for edge and data samples to settle in just half a UI. Additionally, applying DFE correction computed for the data samples (e.g., in the middle of the eye) to the edge samples can result in correlated jitter, which can introduce a pattern sensitivity in the clock recovery. Furthermore, direct feedback DFE can introduce non-linear transients due to current switching that can significantly shift the eye centering.

Various embodiments described herein provide for quarter-rate data sampling with loop-unrolled decision feedback equalization (DFE) that uses a two-summer (e.g., two-summing node) approach. In particular, some embodiments provide for quarter-rate data sampling comprising a plurality of unrolled first-tap DFE loops (e.g., four unrolled first-tap DFE loops), and two summers and a two-to-one multiplexer for each of the other tap loops used for direct feedback (e.g., second tap, third tap, fourth tap, etc.). Use of some embodiments provides more time for a second-tap DFE loop (or some other non-first-tap DFE loop) to settle before the next sampling cycle occurs (e.g., permits eyes to settle by the time the next sampling event comes in). Various embodiments described herein can provide smaller propagation delays, thereby permitting resolving inputs with smaller voltage overdrives, which in turn can allow data recovery with eyes with improved performance. For some embodiments, a plurality of unrolled first-tap DFE loops (e.g., four unrolled first-tap DFE loops) for data acquisition are paired up with a plurality of unrolled first-tap DFE loops (e.g., another four unrolled first-tap DFE loops) for edge detection, where the edge sampling phases can be later (e.g., 0.5 UI later) compared to corresponding data sampling phases.

For some embodiments, an unrolled first-tap DFE loop for data acquisition and an unrolled first-tap DFE loop for edge detection can permit a different ISI correction to be applied to data acquisition and edge detection without timing penalty. For instance, an unrolled first-tap DFE loop can be corrected for interference from a H1 cursor in a pulse response, while another unrolling first-tap DFE loop can be corrected for interferences from the H1.5 cursor. Some embodiments can use a multi-point (e.g., 3-point or 5-point) calibration process to measure and calibrate a data sampler with an offset (e.g., to apply a threshold that accounts for offset and ISI correction).

An embodiment described herein can provide balance between area utilization and improved timing performance within a quarter-rate DFE (compared to a conventional quarter-rate DFE that uses a one-summer approach). Use of an embodiment described herein can diminish a kickback effect (because two sets of data samplers operating on opposite phases of the clock are hooked to each summer), can reduce complexity of multiplexing within the DFE (compared to a one-summer approach), and can permit distribution of data sample load across two summing amplifier outputs (e.g., 50%/50%), with the load being less than what would be seen by use of a single summer.

As used herein, a data sampler can comprise a data slicer (or slicer) that is an edge triggered device configured to sample a signal on a rising edge of a clock signal and reset when the clock signal is low.

As used herein, a tap coefficient with a first polarity (e.g., +H) can comprise a positive or a negative value, and the (same) tap coefficient with a second polarity (e.g., −H) can comprise a positive value or negative value. For some embodiments, a tap coefficient with a first polarity and the tap coefficient with a second polarity are such that the first and second polarities are opposite polarities. For instance, for some embodiments, a first-tap coefficient (e.g., H1) with a first polarity (e.g., +H1) and the first-tap coefficient (e.g., H1) with a second polarity (e.g., −H1) are complementary values, where the two coefficients have the same absolute value but complementary polarity.

Reference will now be made in detail to embodiments of the present disclosure, examples of which are illustrated in the appended drawings. The present disclosure may, however, be embodied in many different forms and should not be construed as being limited to the embodiments set forth herein.

FIGS. 1 through 4 are schematics illustrating example circuits for quarter-rate data sampling with loop-unrolled decision feedback equalization, in accordance with various embodiments.

Referring now to FIG. 1, a circuit 100 is illustrated, which can represent at least a portion of a larger circuit that implements quarter-rate data sampling with loop-unrolled decision feedback equalization (DFE), in accordance with various embodiments. In particular, the circuit 100 represents an example implementation of two-tap, two-sum node quarter-rate DFE of an embodiment. The circuit 100 as shown comprises a first sum node 102 and a second sum node 104, where the first sum node 102 comprises a first unrolled first-tap DEE loop 112, a second unrolled first-tap DEE loop 114, a first multiplexer 120, a (first) second-tap scaling component 122, and a first summer 124, and where the second sum node 104 comprises a third unrolled first-tap DFE loop 116, a fourth unrolled first-tau DFE loop 118, a second multiplexer 130, a (second) second-tap scaling component 132, and a second summer 134. As shown, each of the first sum node 102 and the second sum node 104 is configured to receive an input data signal. For some embodiments, the first unrolled first-tap DEE loop 112 is configured to generate (and output via a first output) a first data sample of a first input signal based on the first input signal (that is generated by the first summer 124), a first-tap coefficient (e.g., H1), a first clock signal (CLK1), and a first first-tap feedback signal (FIRST FTFS). As shown, the first first-tap feedback signal can comprise a sample outputted by the fourth unrolled first-tap DFE loop 118 via a fourth output.

For some embodiments, the second unrolled first-tap DFE loop 114 is configured to generate a second data sample (and output via a second output) of the first input signal based on the first input signal (that is generated by the first summer 124), the first-tap coefficient (e.g., H1), a second clock signal (CLK2), and a second first-tap feedback signal (SECOND FTFS). As shown, the second first-tap feedback signal can comprise a sample outputted by the third unrolled first-tap DFE loop 116 via a third output.

For some embodiments, the third unrolled first-tap DFE loop 116 is configured to generate (and output via the third output) a third data sample of a second input signal based on the second input signal (that is generated by the second summer 134), the first-tap coefficient (e.g., H1), a third clock signal (CLK3), and a third first-tap feedback signal (THIRD FTFS). As shown, the third first-tap feedback signal can comprise a sample outputted by the first unrolled first-tap DFE loop 112 via the first output. In some embodiments, a different first-tap coefficient can be used (e.g., applied) by the second sum node 104 (e.g., the third and the fourth unrolled first-tap DFE loops 116, 118 receiving the second input signal) to account for variations in the circuits connected to the first and second input signals.

For some embodiments, the fourth unrolled first-tap DFE loop 118 is configured to generate (and output via the fourth output) a fourth data sample of the second input signal based on the second input signal (that is generated by the second summer 134), the first-tap coefficient (e.g., H1), a fourth clock signal (CLK4), and a fourth first-tap feedback signal (FOURTH FTFS). As shown, the fourth first-tap feedback signal can comprise a sample outputted by the second unrolled first-tap DFE loop 114 via the second output.

According to some embodiments, the first multiplexer 120, the first second-tap scaling component 122 and the first summer 124 implement a second-tap direct feedback for the first sum node 102 and generate the first input signal for the first and the second unrolled first-tap DFE loops 112, 114. The first multiplexer 120 comprises a two-to-one multiplexer that uses a delayed version (CLK3') of the third clock signal (used by the third unrolled first-tap DFE loop 116) to select whether the first data sample (from the first unrolled first-tap DFE loop 112) or the second data sample (from the second unrolled first-tap DFE loop 114) is outputted to the first second-tap scaling component 122, which applies a second-tap coefficient (H2) to the multiplexer output to generate a first second-tap feedback signal. Thereafter, the first summer 124 applies the first second-tap feedback signal to the input data signal to generate the first input signal for the first and the second unrolled first-tap DFE loops 112, 114.

Similarly, for some embodiments, the second multiplexer 130, the second-tap scaling component 132 and the second summer 134 implement a second-tap direct feedback for the second sum node 104 and generate the second input signal for the third and the fourth unrolled first-tap DFE loops 116, 118. The second multiplexer 130 comprises a two-to-one multiplexer that uses a delayed version (CLK2') of the second clock signal (used by the second unrolled first-tap DFE loop 114) to select whether the third data sample (from the third unrolled first-tap DFE loop 116) or the fourth data sample (from the fourth unrolled first-tap DFE loop 118) is outputted to the second-tap scaling component 132, which applies the second-tap coefficient (H2) to the multiplexer output to generate a second second-tap feedback signal. Thereafter, the second summer 134 applies the second second-tap feedback signal to the input data signal to generate the second input signal for the third and the fourth unrolled first-tap DFE loops 116, 118. For some embodiments, the first, the second, the third, and the fourth clock signals have a predetermined phase difference between them (e.g., quadrature clock signals). For instance, the phase difference between the first clock signal and the second clock signal can be 180 degrees, between the first clock signal and the third clock signal can be 90 degrees, and between the first clock signal and the fourth clock signal can be 270 degrees. In some embodiments, a different second-tap coefficient can be used (e.g., applied) by the second sum node 104 compared to the first sum node 102 to account for variations in the circuits connected to the first and second input signals.

Figure 2:
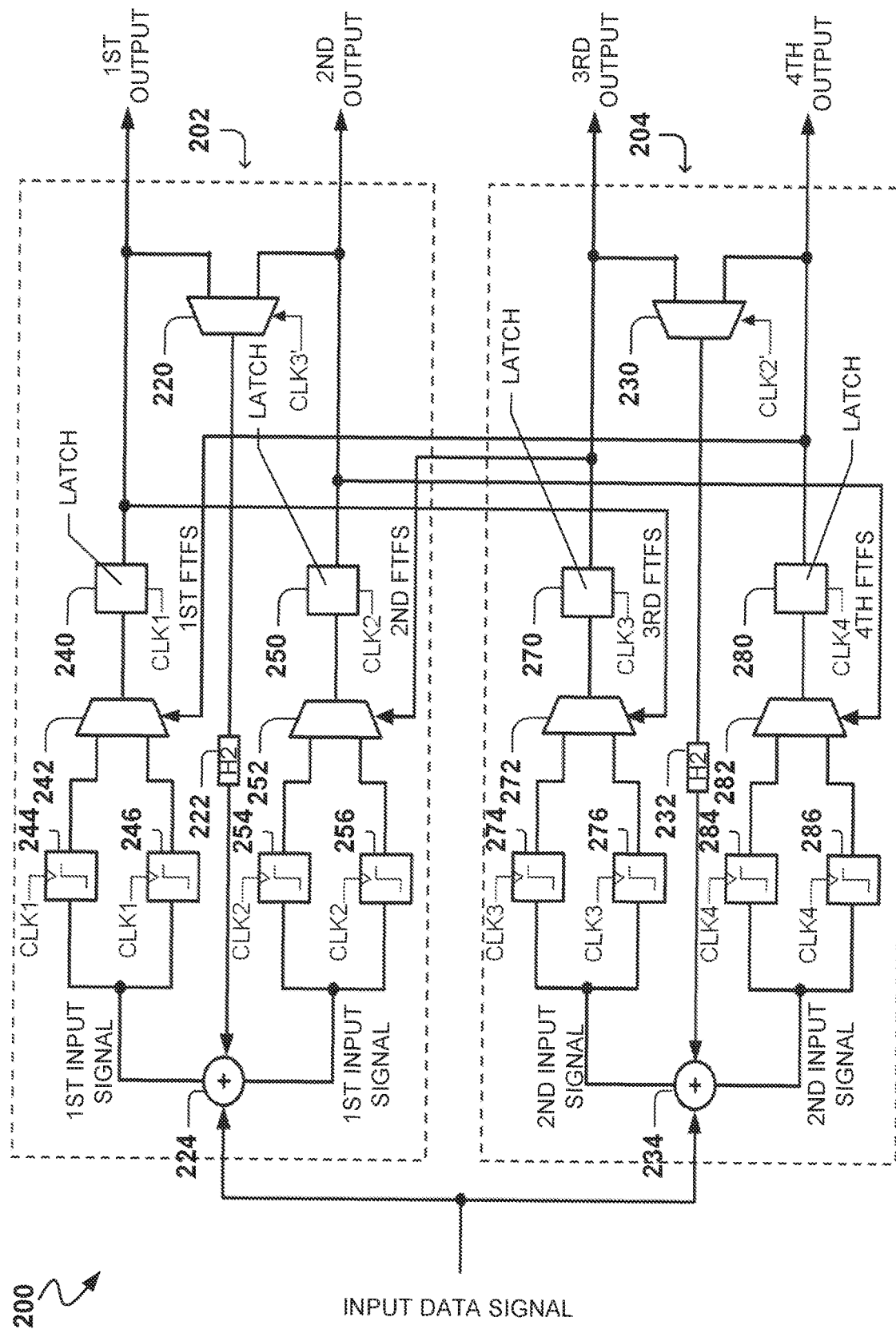

As illustrated in more detail with respect to FIG. 2, each of the first, the second, the third, and the fourth unrolled first-tap DFE loops 112, 114, 116, 118 can comprise a first data sampler, a second data sampler, a multiplexer, and a latch. The first data sampler can be configured to generate a first (first-tap) sample of the first input signal by sampling the first input signal based on the first clock signal while applying a first-tap coefficient with a first polarity (e.g., positive or negative). The second data sampler can be configured to generate the second (first-tap) sample of the first input signal by sampling the first input signal based on the clock signal (e.g., for the first unrolled first-tap DFE loop 112, a first clock signal) while applying the first-tap coefficient with a second polarity (e.g., inverse of the first polarity). The multiplexer can be configured to receive the first (first-tap) sample, receive the second (first-tap) sample, and based on a first-tap feedback signal (e.g., for the first unrolled first-tap DFE loop 112, a first first-tap feedback signal (FIRST FTFS)), selectively output the first (first-tap) sample or the second (first-tap) sample as a multiplexer output signal. The latch can be configured to latch the multiplexer output signal and provide the latched multiplexer output signal as a data sample of the input signal. Though not shown, for alternate embodiments, the multiplexer can be merged into the first and second data sampler, and the latch can be configured as a regeneration stage that minimizes propagation delay.

As noted, the circuit 100 illustrates a two-tap quarter-rate DFE with two sum nodes, where the first tap is unrolled and where the second tap (e.g., second-tap coefficient) is applied directly to the two summing nodes. Though not illustrated, some embodiments implement more than two taps, where direct feedback taps are duplicated and applied to its own sum nodes (having their own summers). For instance, for some embodiments, the direct feedback of even taps of a quarter-rate DFE (e.g., fourth-tap, sixth-tap, etc.) are within the same sum node, while the direct feedback of odd taps of the quarter-rate DFE (e.g., third-tap, fifth-tap, etc.) are fed into the other sum node. For instance, as illustrated with respect to FIG. 3, a third tap would feed back a tap-weighted signal into the first sum node (e.g., 302) based on bits sampled on second sum node (e.g., (304), whereas a fourth tap would feed back a tap-weighted signal into the first sum node (e.g., 302) based on bits sampled on the first sum node (e.g., 302) (which would similar to the second tap feedback illustrated by FIG. 2).

Referring now to FIG. 2, a circuit 200 is illustrated, which can represent at least a portion of a larger circuit that implements quarter-rate data sampling with loop-unrolled decision feedback equalization (DFE), in accordance with various embodiments. In particular, the circuit 200 is similar to the circuit 100 of FIG. 1 and, as such, implements a two-tap, two-sum node quarter-rate DFE. Accordingly, elements 202, 220, 222, 224, 204, 230, 232, 234 are respectively similar to elements 102, 120, 122, 124, 104, 130, 132, 134 of FIG. 1. Additionally, FIG. 2 illustrates example implementations of each of the first, the second, the third, and the fourth unrolled first-tap DFE loops 112, 114, 116, 118 of the circuit 100 of FIG. 1.

In FIG. 2, the first unrolled first-tap DFE loop 112 of the circuit 100 is implemented by: a first data sampler 244 to apply a first-tap coefficient (e.g., H1) with a first polarity (e.g., +H1); a second data sampler 246 to apply the first-tap coefficient (e.g., H1) with a second polarity (e.g., −H1) that is a complement of the first polarity; a multiplexer 242 (e.g., two-to-one multiplexer) configured to receive the outputs of the first and the second data samplers 244, 246 and selectively outputs the output of the first data sampler 244 or the output of the second data sampler 246 based on a first first-tap feedback signal received as a selection input. According to various embodiments, the first first-tap feedback signal (FIRST FTFS) can comprise the output of the fourth unrolled first-tap DFE loop implemented by elements 280, 282, 284, 286.

As shown, each of the second, the third, and the fourth unrolled first-tap DFE loops 114, 116, 118 of the circuit 100 is implemented in a manner similar to the first unrolled first-tap DFE loop 112. The second unrolled first-tap DFE loop 114 is implemented by a first and a second data samplers 254, 256, a multiplexer 252, and a latch 250, where the second first-tap feedback signal (SECOND FTFS) can comprise the output of the third unrolled first-tap DFE loop implemented by elements 270, 272, 274, 276. The third unrolled first-tap DFE loop 116 is implemented by a first and a second data samplers 274, 276, a multiplexer 272, and a latch 270, where the third first-tap feedback signal (THIRD FTFS) can comprise the output of the first unrolled first-tap DFE loop implemented by elements 240, 242, 244, 246. The fourth unrolled first-tap DFE loop 118 is implemented by a first and a second data samplers 284, 286, a multiplexer 282, and a latch 280, where the fourth first-tap feedback signal (FOURTH FTFS) can comprise the output of the second unrolled first-tap DFE loop implemented by elements 250, 252, 254, 256.

Though not shown, for alternate embodiments, the multiplexers 242, 252, 272 282 can be respectively merged into the first data samplers 244, 254, 274, 284 and the second data samplers 246, 256, 276, 286 (e.g., by way of tri-state outputs), and the latches 240, 250, 270, 280 can be configured as regeneration stages that minimize propagation delay. For instance, the first unrolled first-tap DFE loop 112 can comprise: a first data sampler configured to generate a first first-tap sample of the first input signal by sampling the first input signal based on the first clock signal while applying the first-tap coefficient with a first polarity, where the first data sampler comprises a first tri-state output configured to provide the first first-tap sample and controlled by the first first-tap feedback signal; a second data sampler configured to generate a second first-tap sample of the first input signal by sampling the first input signal based on the first clock signal while applying the first-tap coefficient with a second polarity, where the second data sampler comprises a second tri-state output configured to provide the second first-tap sample and controlled by an inverse of the first first-tap feedback signal; and a regenerative latch portion coupled to the first tri-state output and the second tri-state output, where the regenerative latch portion is configured to receive a sampler output signal from at least one of the first tri-state output or the second tri-state output, to latch the sampler output signal based on the clock signal, to regenerate the latched sampler output signal, and to provide the regenerated latched sampler output signal.

Figure 3:
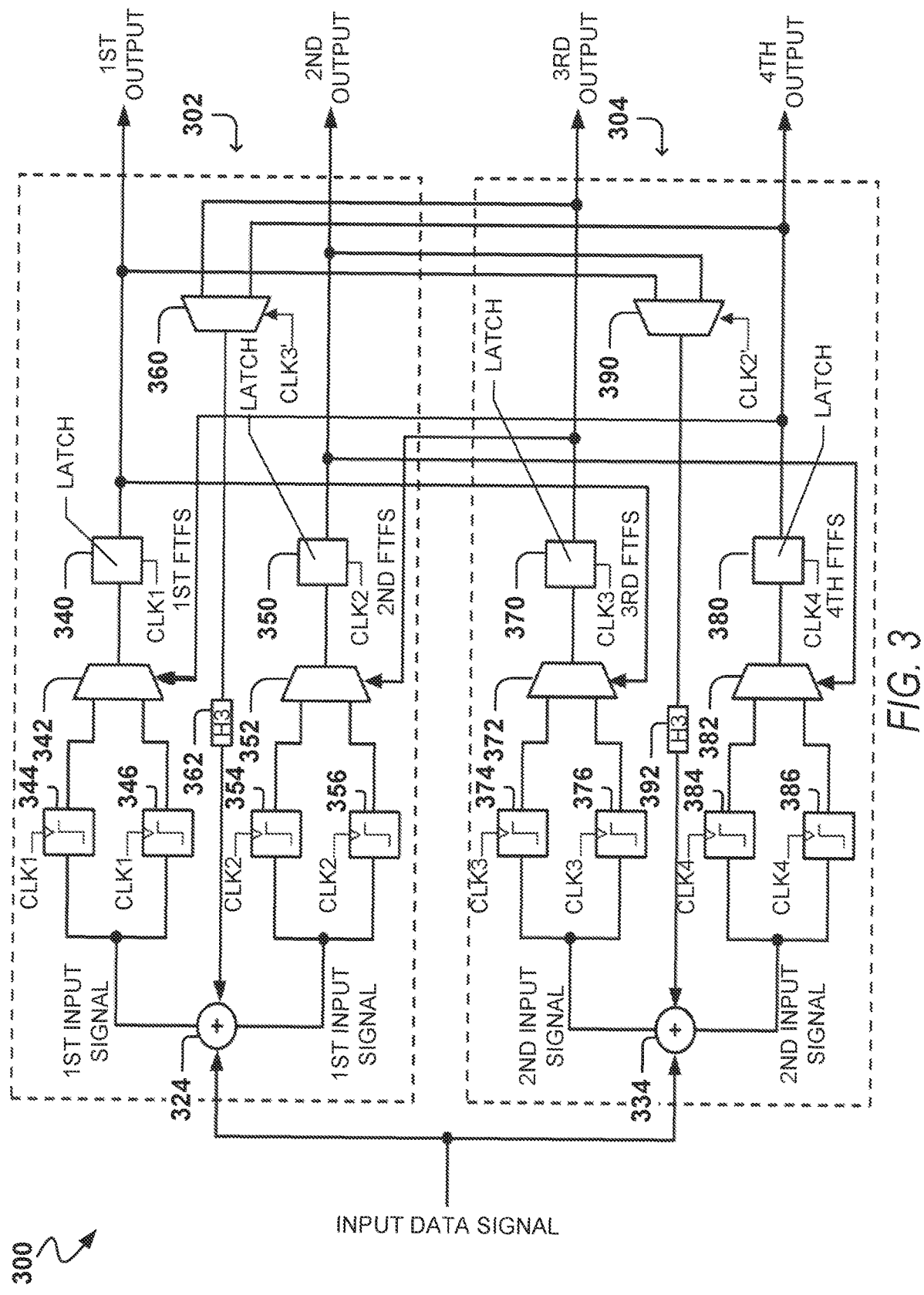

Referring now to FIG. 3, a circuit 300 is illustrated, which can represent at least a portion of a larger circuit that implements quarter-rate data sampling with loop-unrolled decision feedback equalization (DFE), in accordance with various embodiments. In particular, the circuit 300 represents the circuit 200 of FIG. 2 with a third-tap direct feedback implemented by elements 360, 362, 390, 392. For simplicity, the second-tap direct feedback (e.g., implemented by elements 202, 222, 230, 232) of the circuit 200 is not shown in the circuit 300 of FIG. 3. Elements 324, 334, 340, 342, 344, 346, 350, 352, 354, 356, 370, 372, 374, 376, 380, 382, 384, 386 are respectively similar to elements 224, 234, 240, 242, 244, 246, 250, 252, 254, 256, 270, 272, 274, 276, 280, 282, 284, 286 of the circuit 200 of FIG. 2.

As shown, the third-tap direct feedback for the first sum node 302 is implemented by a multiplexer 360 and a third-tap scaling component 362, and the third-tap direct feedback for the second sum node 304 is implemented by a multiplexer 390 and a third-tap scaling component 392. The multiplexer 360 comprises a two-to-one multiplexer that uses a delayed version (CLK3') of the third clock signal (used by the third unrolled first-tap DFE loop implemented by 370, 372, 374, 376) to select whether the third data sample (from the third unrolled first-tap DFE loop implemented by 370, 372, 374, 376) or the fourth data sample (from the fourth unrolled first-tap DFE loop implemented by 380, 382, 384, 386) is outputted to the third-tap scaling component 362, which applies a third-tap coefficient (H3) to the multiplexer output to generate a first third-tap feedback signal. Thereafter, the first summer 324 applies the first third-tap feedback signal to the input data signal to generate the first input signal for the first and the second unrolled first-tap DFE loops.

Similarly, the multiplexer 390 comprises a two-to-one multiplexer that uses a delayed version (CLK2') of the second clock signal (used by the second unrolled first-tap DFE loop) to select whether the first data sample (from the first unrolled first-tap DFE loop implemented) or the second data sample (from the second unrolled first-tap DFE loop implemented) is outputted to a third-tap scaling component 392, which applies the third-tap coefficient (H3) to the multiplexer output to generate a second third-tap feedback signal. Thereafter, the second summer 334 applies the second third-tap feedback signal to the input data signal to generate the second input signal for the third and the fourth unrolled first-tap DFE loops.

Figure 4:
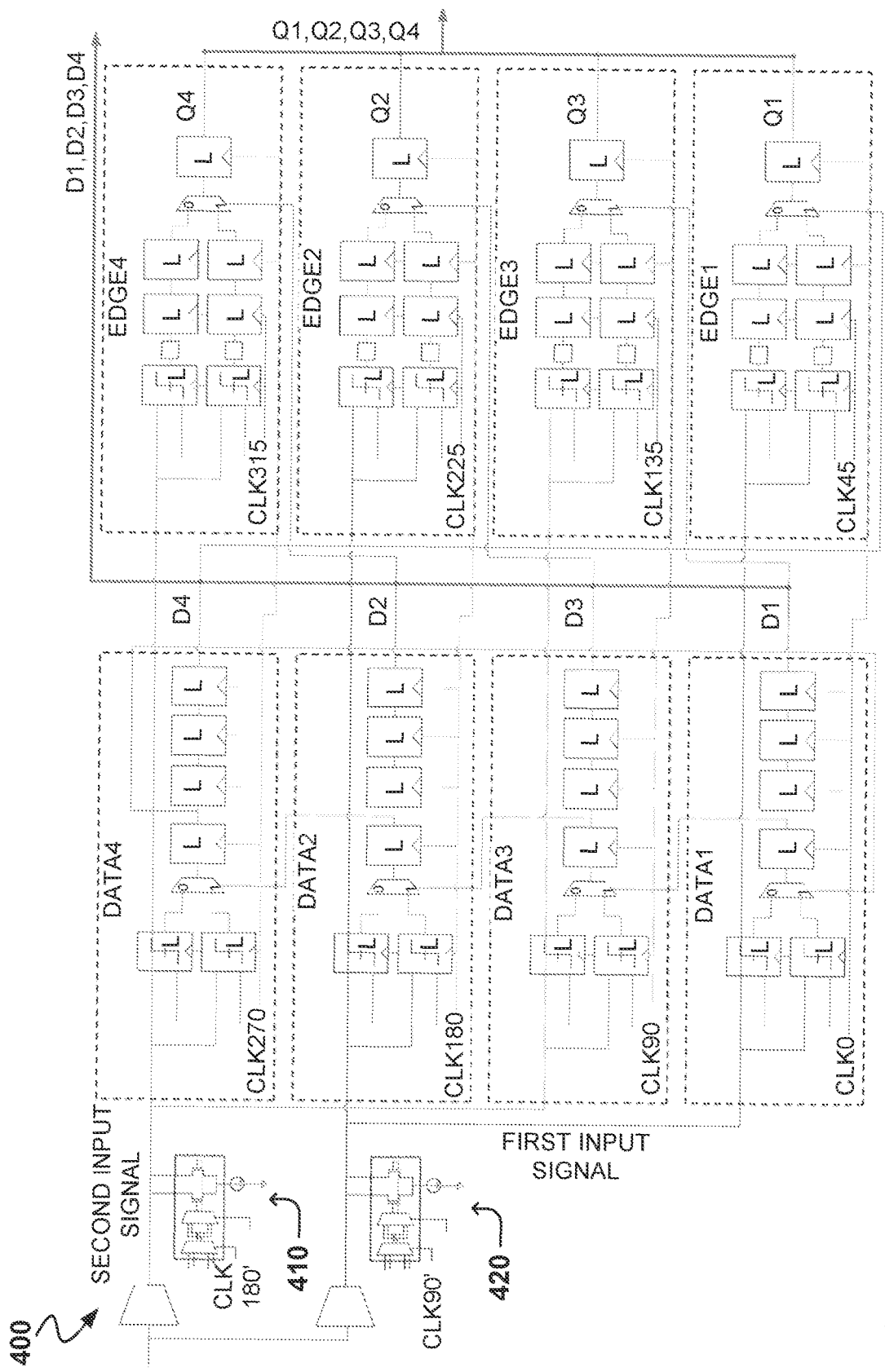

Referring now to FIG. 4, a circuit 300 is illustrated, which can represent an example implementation of at least a portion of a larger circuit that implements quarter-rate loop-unrolled decision feedback equalization (DFE) for data sampling and edge sampling, in accordance with various embodiments. In particular, the circuit 400 comprises four unrolled first-tap DFE loops for data sampling (DATA1, DATA2, DATA3, DATA4) that output D1, D2, D3, D4 respectively to a deserializer, and four unrolled first-tap DFE loops for edge sampling (EDGE1, EDGE2, EDGE3, EDGE4) output Q1, Q2, Q3, Q4 respectively to a deserializer. Tap feedback component 410 represents a first summer (e.g., summing node) and direct tap feedback for a first sum node comprising DATA1 and DATA2, and a tap feedback component 420 represents a second summer and direct tap feedback for a second sum node comprising DATA3 and DATA4. For various embodiments, each of the tap feedback components 410, 420 provide direct tap feedback (e.g., for a second tap, third tap, fourth tap, etc.) for their respective sum node.

As shown, the tap feedback component 420 operates on a clock signal (delayed version of CLK90) and generates a first input signal for the DATA1 and DATA2. The tap feedback component 410 operates based on a clock signal (delayed version of CLK180) having 90-degree phase difference from CLK90, and generates a second input signal for DATA3 and DATA4. DATA1 operates based on CLK0, DATA3 operates based on a clock signal (CLK90) having a 90-degree phase difference from CLK0, DATA2 operates based on a clock signal (CLK180) having a 180-degree phase difference from CLK0, and DATA4 operates based on a clock signal (CLK270) having a 270-degree phase difference from CLK0. EDGE1 and EDGE2 are paired up with DATA1 and DATA2 respectively, and receive the first input signal generated by the tap feedback component 420. Likewise, EDGE3 and EDGE4 are paired up with DATA3 and DATA4 respectively, and receive the second input signal generated by the tap feedback component 410. For some embodiments, edge sampling phases are late compared to corresponding data sampling phases (e.g., 0.5 UI late). Accordingly, in FIG. 4, the clock signal (CLK0) driving DATA1 is 0.5 UI earlier than the clock signal (CLK45) driving EDGE1, which is has a 45 degree difference from CLK0; the clock signal (CLK90) driving DATA3 is 0.5 UI earlier than the clock signal (CLK135) driving EDGE3, which is has a 135 degree difference from CLK0; the clock signal (CLK180) driving DATA2 is 0.5 UI earlier than the clock signal (CLK225) driving EDGE2, which is has a 225 degree difference from CLK0; and the clock signal (CLK270) driving DATA4 is 0.5 UI earlier than the clock signal (CLK315) driving EDGE4, which is has a 315 degree difference from CLK0.

Figure 5:
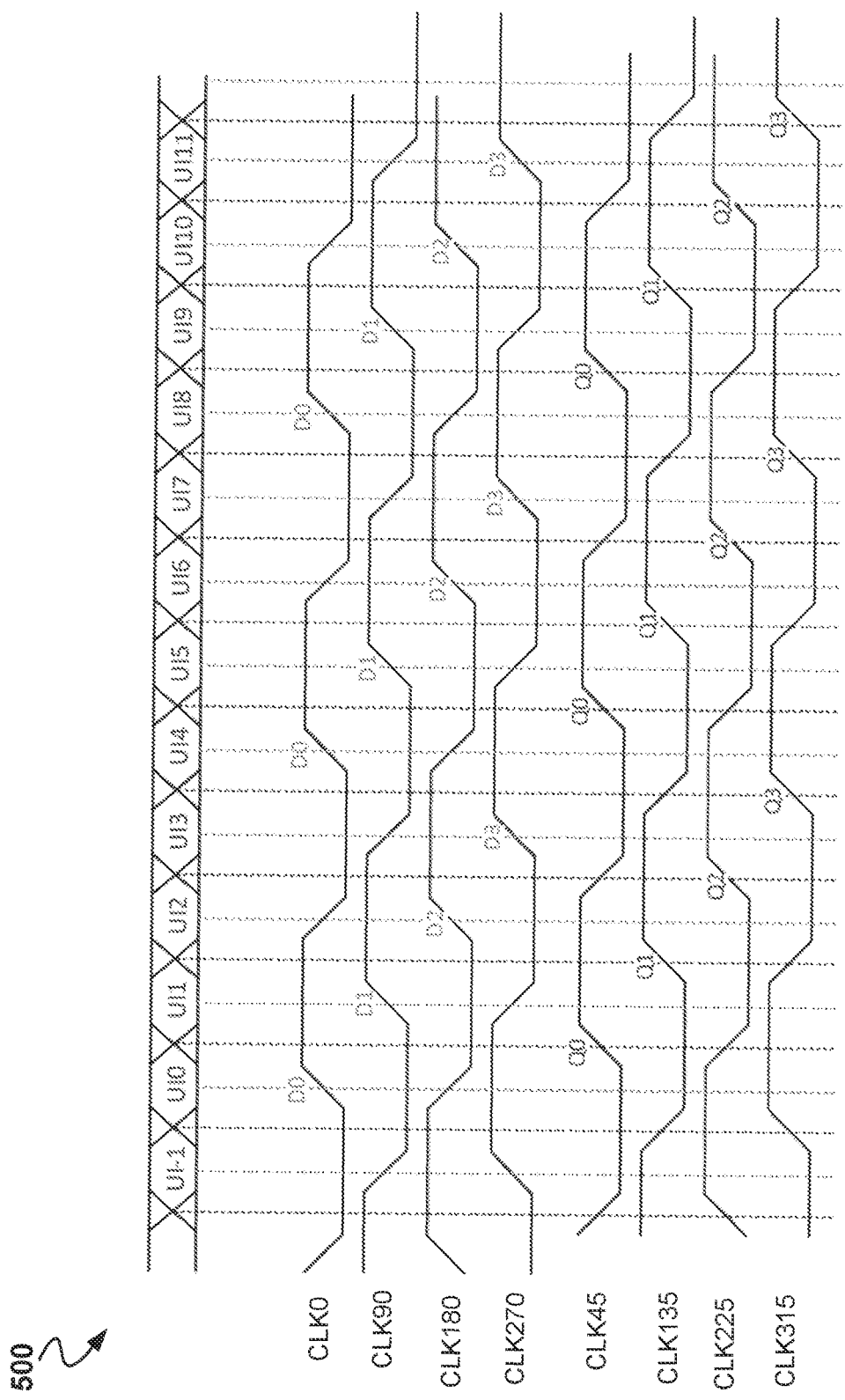
FIG. 5 is a graph illustrating example clock signals that can be used with quarter-rate data sampling with loop-unrolled decision feedback equalization, in accordance with various embodiments.

FIG. 5 is a graph 500 illustrating these example clock signals (CLK0, CLK90, CLK180, CLK270, CLK45, CLK135, CLK225, CLK315) across multiple UIs (UI-1 through UI11). In particular, graph 500 illustrates the relationship between the clock signals, and the sampling phases of unrolled first-tap DFE loops they respectively drive.

Referring again FIG. 4, as shown, multiplexer selection within the unrolled first-tap DFE loops for edge sampling (EDGE1, EDGE2, EDGE3, EDGE4) are driven by the outputs (D1, D2, D3, D4) of the unrolled first-tap DFE loops for data sampling (DATA1, DATA2, DATA3, DATA4). In particular, the output (D4) of DATA4 drives the multiplexer selection within the unrolled first-tap DFE loop of EDGE1, the output (D1) of DATA1 drives the multiplexer selection within the unrolled first-tap DFE loop of EDGE3, the output (D3) of DATA3 drives the multiplexer selection within the unrolled first-tap DFE loop of EDGE2, and the output (D2) of DATA2 drives the multiplexer selection within the unrolled first-tap DFE loop of EDGE4.

For some embodiments, one of the edge-sampling unrolled first-tap DFE loops (EDGE1, EDGE2, EDGE3, EDGE4) can be disabled for edge sampling (e.g., edge sampling performed by the loop is taken offline) so that the disabled edge-sampling unrolled first-tap DFE loop can be reused (e.g., repurposed) to perform measurement tasks. In this way, some embodiments can obviate the need for dedicated samplers to perform measurement tasks, which avoids additional load on each summer and saves circuit area. For instance, EDGE1 can be taken offline to perform measurements with respect to the eye of the input data signal (e.g., derive eye amplitude or perform amplitude correlations with past bit values). The remaining three the edge-sampling unrolled first-tap DFE loops (e.g., EDGE2, EDGE3, EDGE4) can remain in use for edge sampling, which facilitate clock recovery. For example, a voting strategy can be used with the remaining three edge-sampling unrolled first-tap DFE loops to facilitate clock recovery, where samples from the remaining edge-sampling unrolled first-tap DFE loops are voted upon. Depending on the embodiment, one of the edge-sampling unrolled first-tap DFE loops performing edge sampling (EDGE1, EDGE2, EDGE3, EDGE4) can be taken offline by masking the output of the offline edge-sampling unrolled first-tap DFE loops so that the output is not used for clock recovery process (e.g., while the other three edge-sampling unrolled first-tap DFE loops can continue to vote for clock recovery purposes).

For some embodiments, one of the edge-sampling unrolled first-tap DFE loops (EDGE1, EDGE2, EDGE3, EDGE4) can be disabled for edge sampling (e.g., edge sampling performed by the loop is taken offline) so that recalibration can be performed on the disabled edge-sampling unrolled first-tap DFE loop. For instance, the disabled edge-sampling unrolled first-tap DFE loop can be recalibrated to compensate for voltage or temperature drifts. For instance, the data samplers of the disabled edge-sampling unrolled first-tap DFE loop can include an alternate port where a target voltage can be applied. The disablement and recalibration of the EDGE1, EDGE2, EDGE3, EDGE4 can be performed periodically (e.g., to track environmental conditions evolving over time).

Figure 6:
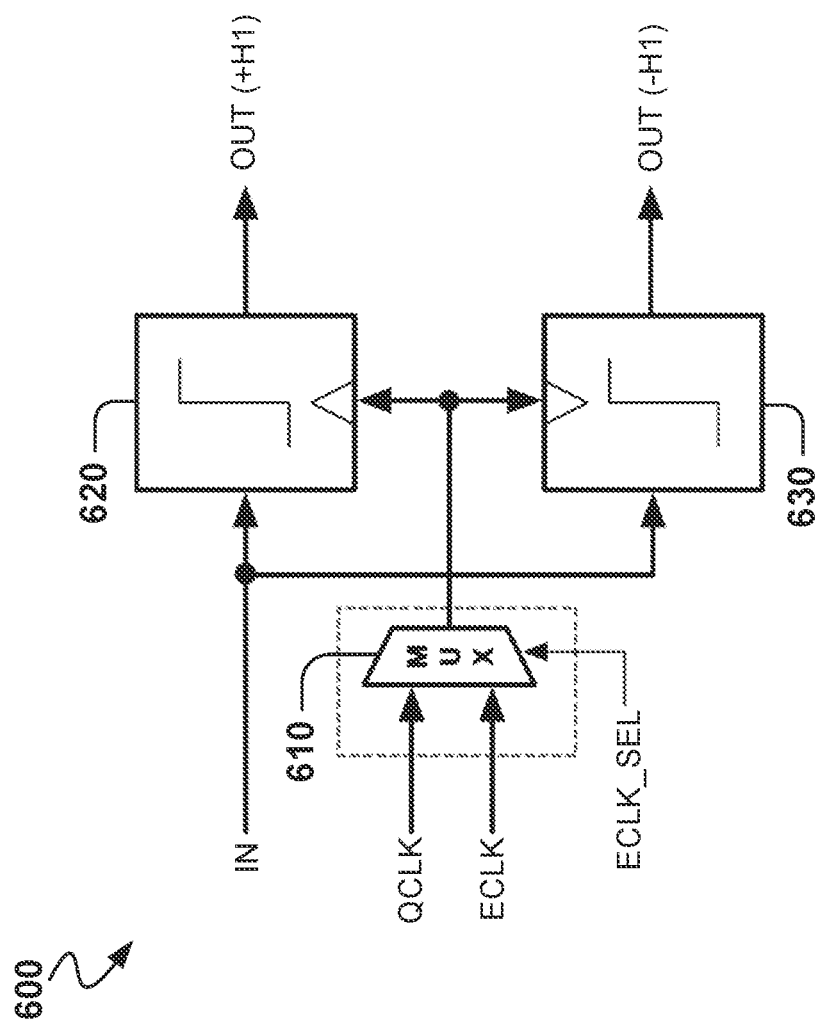
FIG. 6 is a schematic illustrating an example circuit for switching clock sources for a data sampler for edge detection, in accordance with various embodiments.

The data samplers within the edge-sampling unrolled first-tap DFE loop (EDGE1, EDGE2, EDGE3, or EDGE4) disabled and selected (e.g., repurposed) for a measurement task can be configured to select between two clock sources, which can enable the selected edge-sampling unrolled first-tap DFE loop to perform full eye scanning. FIG. 6 is a schematic illustrating an example circuit 600 for switching clock sources for a data sampler for edge detection, in accordance with various embodiments. In particular, the circuit 600 comprises data samplers 620, 630 of an edge-sampling unrolled first-tap DFE loop (EDGE1, EDGE2, EDGE3, or EDGE4), each of which is driven by a clock signal provided through a multiplexer 610. Based on a selection signal (ECLK_SEL), the multiplexer 610 can selectively provide the data samplers 620, 630 with a Q clock signal (QCLK) or an E clock signal (ECLK). QCLK can be used during clock recovery and can be moved closer or further away from a data clock signal (DCLK) to improve data recovery performance. For some embodiments, QCLK lies 0.5 UI away from the center of the eye. In comparison, ECLK can be derived from a separate phase interpolator circuit, which can be moved by at least +/−0.5 UI relative to the center of the eye center. When the selected edge-sampling unrolled first-tap DFE loop is performing edge sampling (e.g., enabled), ECLK_SEL can be set such that the multiplexer 610 provides the data samplers 620, 630 with the QCLK. When the selected edge-sampling unrolled first-tap DFE loop is disabled and performing a measurement task, ECLK_SEL can be set such that the multiplexer 610 provides the data samplers 620, 630 with the ECLK, thereby enabling the data samplers 620, 630 to scan the eye.

For some embodiments, prior to the selected edge-sampling unrolled first-tap DFE loop being used to perform a measurement task using the ECLK, ECLK is aligned with the data clock signal (DCLK) being used by data-sampling unrolled first-tap DFE loop that the selected edge-sampling unrolled first-tap DFE loop is paired with (e.g., where EDGE2 is disabled and being used for a measurement task, DCLK would comprise CLK180, which drives DATA2). For some embodiments, this alignment between ECLK and a data clock signal (DCLK) is performed by a phase aligner circuit, such as the one illustrated by FIG. 7.

Figure 7:
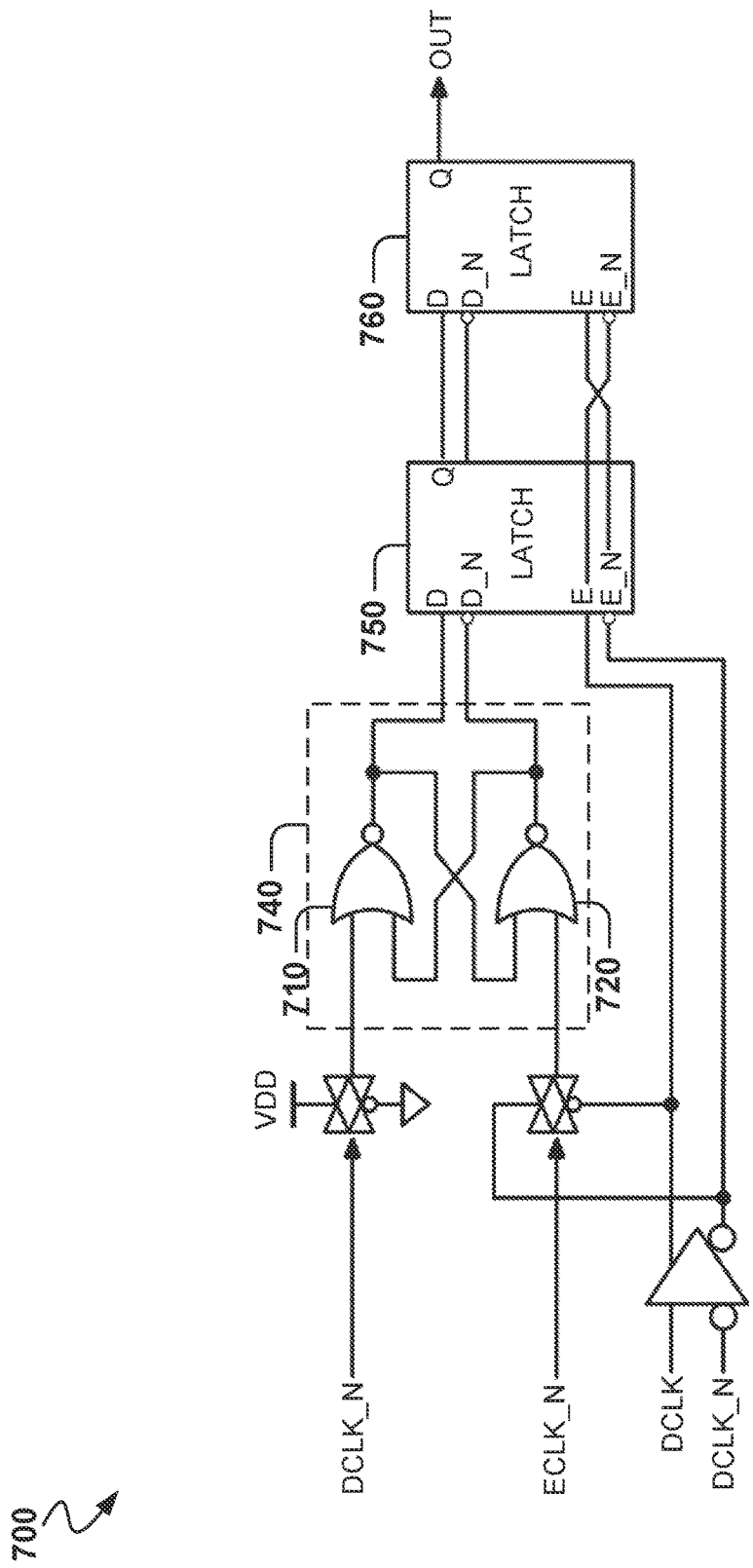
FIG. 7 is a schematic illustrating an example phase alignment circuit that can be used by a data sampler for edge detection, in accordance with various embodiments.

FIG. 7 is a schematic illustrating an example phase alignment circuit 700 that can be used by a data sampler for edge detection, in accordance with various embodiments. In particular, the phase alignment circuit 700 is configured to use an SR-latch 740, resynchronizing latches 750, 760 and configured to be sensitive to the falling edges of the input clocks, DCLK N and ECLK N. For an alternative embodiment not shown, the phase alignment circuit 700 can be configured to be sensitive to the rising edges of the input clocks. In FIG. 7, the SR-latch 740 detects which of the falling edges arrives earliest and that determination is resynchronized by resynchronizing latches 750, 760. A digital feedback loop (not shown) can process the early/late (e.g., 1 or 0) information out of this phase alignment circuit 700 to control a phase interpolator and align the ECLK with the DCLK.

For some embodiments, each edge-sampling unrolled first-tap DFE loop are iteratively selected for a measurement task, thereby causing the ECLK to be iteratively re-aligned with a DCLK corresponding to the selected edge-sampling unrolled first-tap DFE loop. In this way, some embodiments can obtain four distinct measurement covering the two sum nodes of the quarter-rate DFE. Depending on the embodiment, the four measurements can be averaged to obtain a mean measurement, or the four measurements can be averaged per a sum node of the quarter-rate DFE. The average measurement per sum node can provide a glimpse into each sum node's eye opening or can facilitate adaptation of a sum node when the sum-node averages differ. For instance, a difference in sum-node averages can occur due to mismatches in gain and offset that may arise between the sum nodes (e.g., some taps may be under or over equalized for one of the sum nodes, or signal amplitude may be too high or too low for one sum node).

Figure 8:
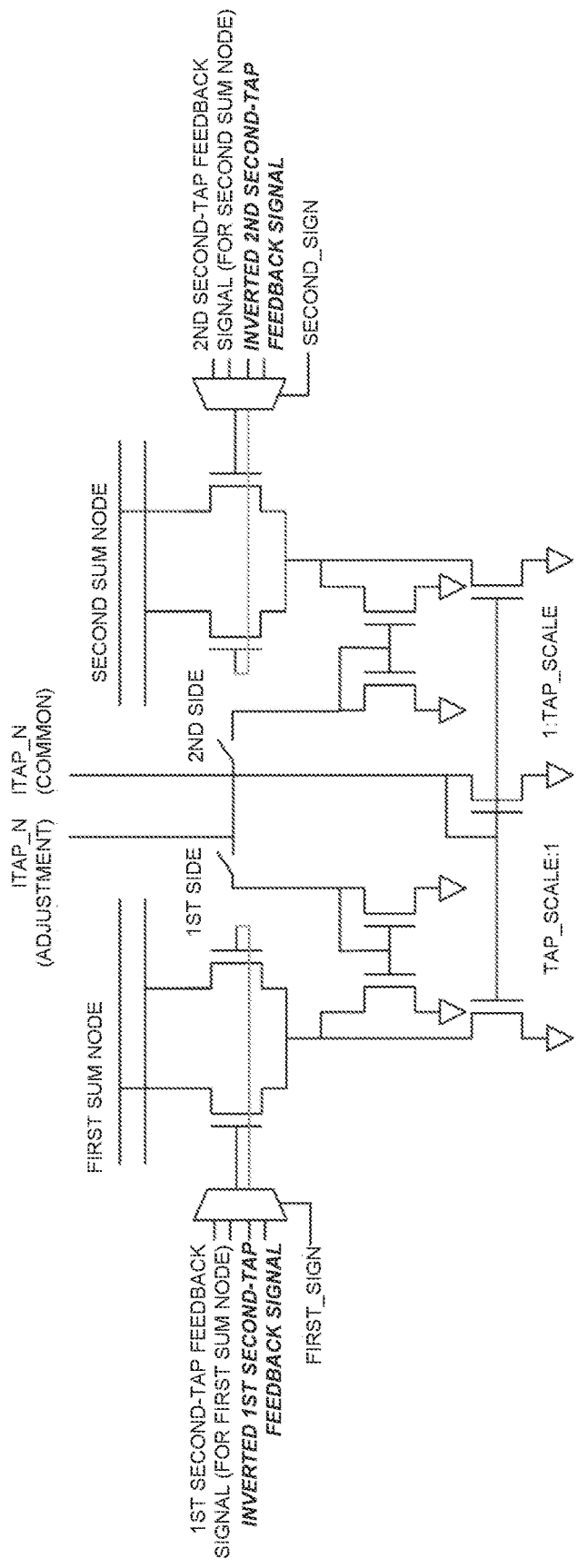
FIG. 8 is a schematic illustrating an example circuit for a current tap that can be used with quarter-rate data sampling with loop-unrolled decision feedback equalization, in accordance with various embodiments.

Per sum-node adaptation can comprise, for example, sending different tap currents to either sum node, which can be facilitated by a circuit illustrated by FIG. 8. Per sum-node adaptation can comprise applying different first-tap corrections (H1) where the voltage threshold of each data sampler is independent. Additionally, per sum-node adaptation can comprise setting different voltage thresholds for correlating eye amplitude with previous bits, which can compensate for average peak-peak amplitude mismatch (due to gain mismatch between sum nodes).

FIG. 8 is a schematic illustrating an example circuit 800 for a current tap that can be used with quarter-rate data sampling with loop-unrolled decision feedback equalization (DFE), in accordance with various embodiments. With use of the circuit 800, some embodiments can provide each one of the quarter-rate DFE's direct feedback taps a programmable current that is replicated for both first and second sum nodes. In the circuit 800, the common current is copied over to both the first sum node and the second sum node, and the circuit 800 is configured such that an adjustment current is sent to the side (first side or second side) that needs it (e.g., the circuit 800 provides a smaller adjustment current to the sum node (first or second sum node) that needs the most current).

Figure 9:
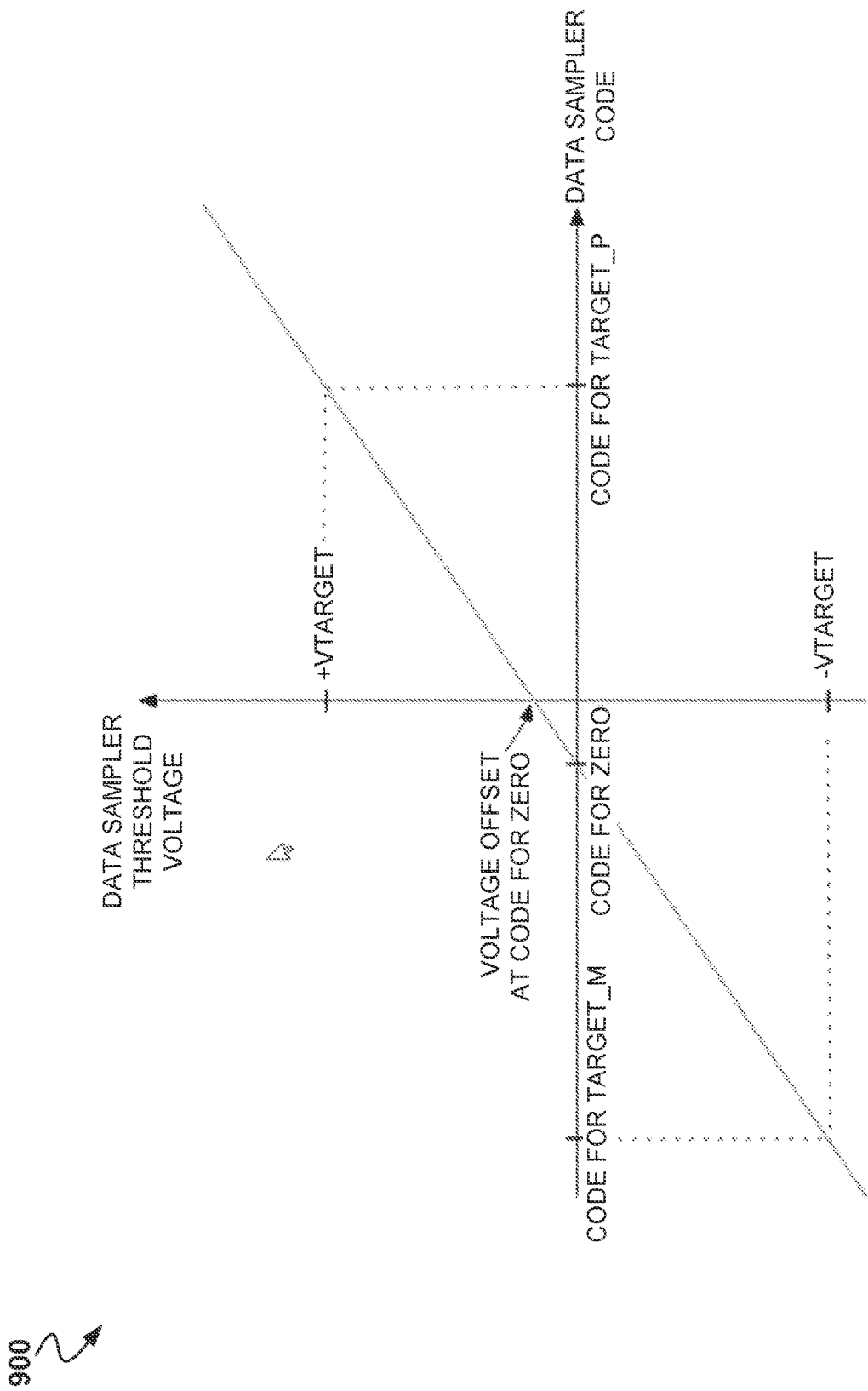
FIG. 9 is a graph illustrating an example of multi-point calibration process that can be used with an example quarter-rate data sampling with loop-unrolled decision feedback equalization, in accordance with various embodiments.

FIG. 9 is a graph 900 illustrating an example of multi-point calibration process that can be used with an example quarter-rate data sampling with loop-unrolled decision feedback equalization (DFE), in accordance with various embodiments. In particular, graph 900 illustrates an example of a three-point calibration process for a data sampler of a data-sampling or an edge-sampling unrolled first-tap DFE loop (e.g., an edge-sampling unrolled first-tap DFE loop that is taken offline). The illustrated three-point calibration process can enable some embodiments to measure and calibrate the transfer characteristic of a given data sampler (which can facilitate ISI correction). With respect to a given data sampler, the calibration process can comprise applying a zero-volt threshold to the given data sampler's input port(s) and determining (e.g., identifying) a corresponding threshold voltage code (CODE FOR ZERO) for the given data sampler. Subsequently, a first target voltage is applied to the given data sampler's input port(s) and a corresponding first threshold voltage code (CODE FOR TARGET_P) is determined (e.g., identified) for the given data sampler. Additionally, a second target voltage (having same target voltage as the first target voltage but with a reverse polarity) is applied to the given data sampler's input port(s) and a corresponding second threshold voltage code (CODE FOR TARGET_M) is determined (e.g., identified) for the given data sampler. Based on these measurements, two slopes and an offset are derived, as illustrated by graph 900. Prior to application of threshold voltage codes to the given data sampler, some embodiments use the two slopes and the offset to determine (e.g., derive) correction factors for the given data sampler.

Figure 10:
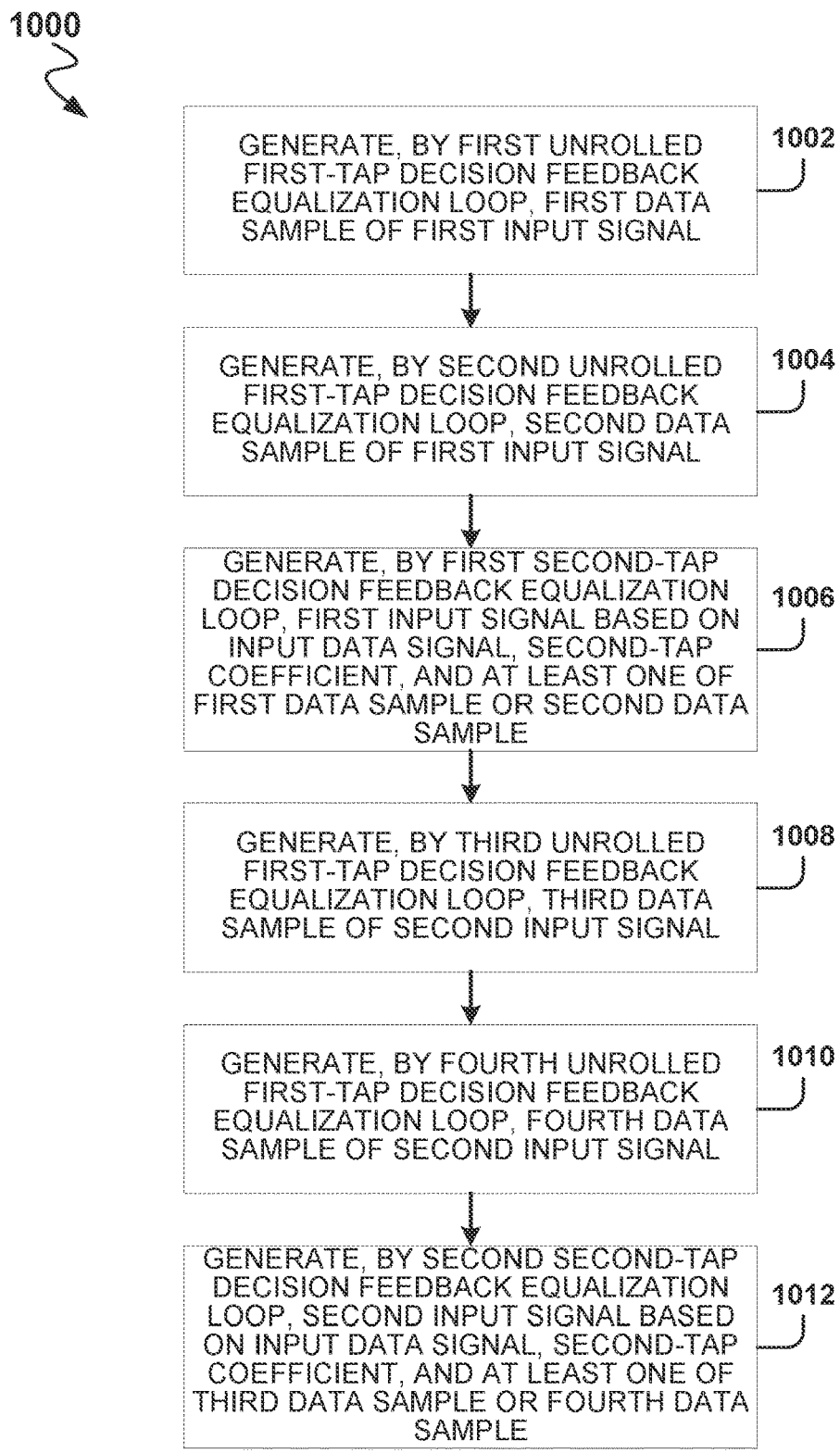
FIG. 10 is a flowchart illustrating an example method for quarter-rate data sampling with loop-unrolled decision feedback equalization, in accordance with various embodiments.

FIG. 10 is a flowchart illustrating an example method 1000 for quarter-rate data sampling with loop-unrolled decision feedback equalization, in accordance with various embodiments. Some or all of the method 1000 can be performed by a circuit, such as one or more of the circuits/components described herein with respect to FIGS. 1 through 4. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

At operation 1002, a first data sample of a first input signal is generated, by a first unrolled first-tap decision feedback equalization loop (e.g., 112), based on the first input signal, a first-tap coefficient, a first clock signal, and a first first-tap feedback signal. Likewise, at operation 1004, a second data sample of the first input signal is generated, by a second unrolled first-tap decision feedback equalization loop (e.g., 114), based on the first input signal, the first-tap coefficient, a second clock signal, and a second first-tap feedback signal. With operation 1006, a first second-tap decision feedback equalization loop (e.g., combination of the first multiplexer 120, the second-tap scaling component 122, the summer 124) generates the first input signal based on an input data signal (e.g., received at a data receiver), a second-tap coefficient and at least one of the first data sample (generated by the first unrolled first-tap decision feedback equalization loop) or the second data sample (generated by the second unrolled first-tap decision feedback equalization loop).

At operation 1008, a third data sample of a second input signal is generated, by a third unrolled first-tap decision feedback equalization loop (e.g., 116), based on the second input signal, the first-tap coefficient, a third clock signal, and a third first-tap feedback signal. Similarly, at operation 1010, a fourth data sample of the second input signal is generated, by a fourth unrolled first-tap decision feedback equalization loop (e.g., 118), based on the second input signal, the first-tap coefficient, a fourth clock signal, and a fourth first-tap feedback signal. With operation 1012, a second second-tap decision feedback equalization loop (e.g., combination of the second multiplexer 130, the second-tap scaling component 132, the summer 134) generates the second input signal based on the input data signal (e.g., received at a data receiver), the second-tap coefficient and at least one of the third data sample (generated by the third unrolled first-tap decision feedback equalization loop) or the fourth data sample (generated by the fourth unrolled first-tap decision feedback equalization loop).

For various embodiments, the first first-tap feedback signal comprises the fourth data sample from (e.g., generated by) the fourth unrolled first-tap decision feedback equalization loop, the second first-tap feedback signal comprises the third data sample from the third unrolled first-tap decision feedback equalization loop, the third first-tap feedback signal comprises the first data sample from the first unrolled first-tap decision feedback equalization loop, and the fourth first-tap feedback signal comprises the second data sample from the second unrolled first-tap decision feedback equalization loop.

Figure 11:
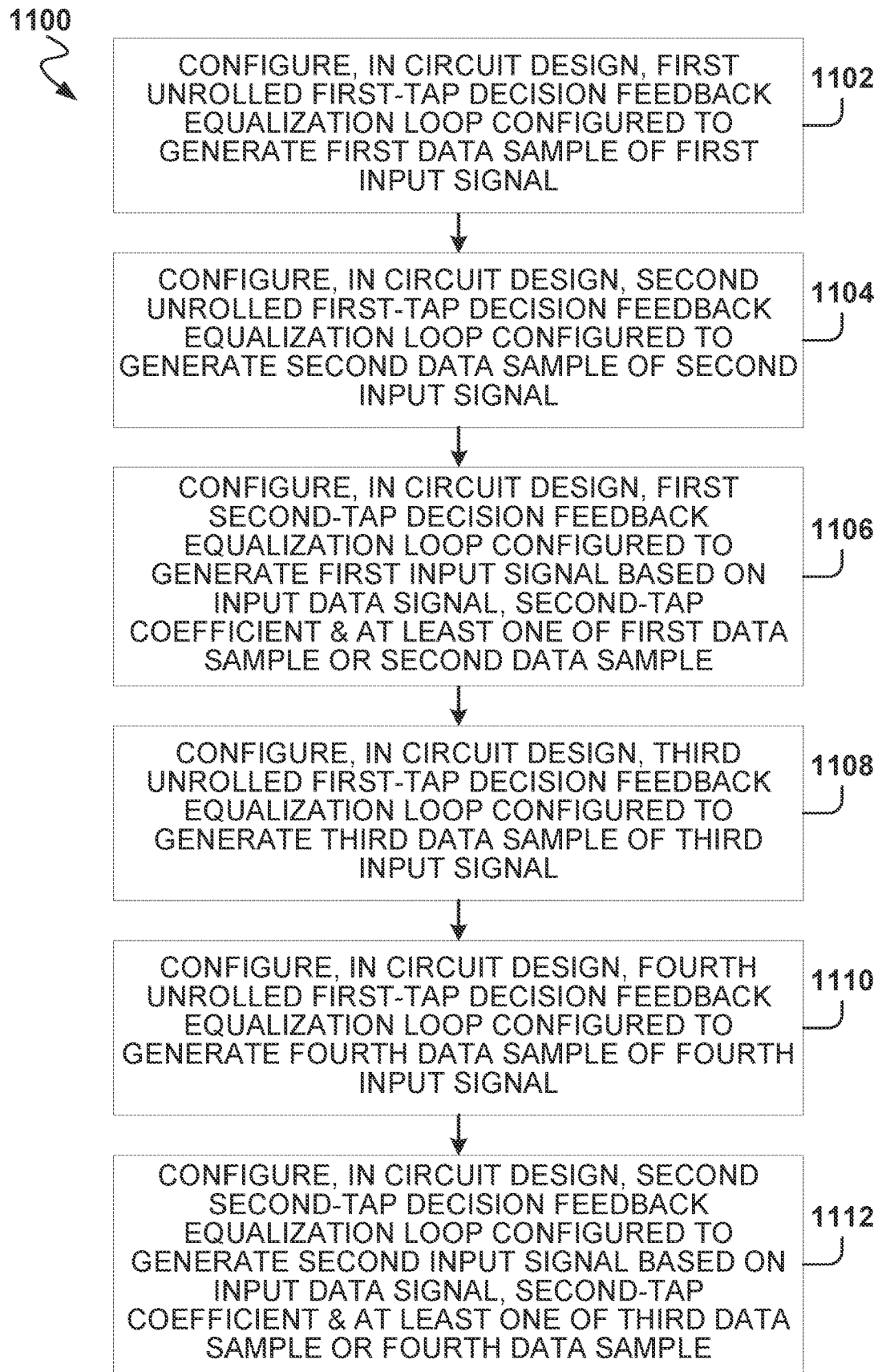
FIG. 11 is a flowchart illustrating an example method for generating a circuit design that includes quarter-rate data sampling with loop-unrolled decision feedback equalization, in accordance with some embodiments.

FIG. 11 is a flowchart illustrating an example method 1100 for generating a circuit design that includes quarter-rate data sampling with loop-unrolled decision feedback equalization, in accordance with some embodiments. It will be understood that the method 1100 can be performed by a device, such as a computing device executing instructions of an EDA software system, in accordance with some embodiments. Additionally, the method 1100 herein can be implemented in the form of executable instructions stored on a computer-readable medium or in the form of electronic circuitry. For instance, the operations of the method 1100 may be represented by executable instructions that, when executed by a processor of a computing device, cause the computing device to perform the method 1100. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

Depending on the embodiment, the method 1100 can implement within a circuit design one of the circuits described herein with respect to FIGS. 1 through 4.

At operation 1102, a first unrolled first-tap decision feedback equalization loop is configured in a circuit design, where the first unrolled first-tap decision feedback equalization loop is configured to generate a first data sample of a first input signal based on the first input signal, a first-tap coefficient (e.g., H1), a first clock signal (e.g., 0 degree clock signal), and a first first-tap feedback signal. Similarly, at operation 1104, a second unrolled first-tap decision feedback equalization loop is configured in the circuit design, where the second unrolled first-tap decision feedback equalization loop is configured to generate a second data sample of the first input signal based on the first input signal, the first-tap coefficient, a second clock signal (e.g., 180-degree clock signal), and a second first-tap feedback signal. With operation 1106, a first second-tap decision feedback equalization loop is configured in the circuit design, where the first second-tap decision feedback equalization loop is configured to generate the first input signal based on an input data signal, a second-tap coefficient (e.g., H2) and at least one of the first data sample or the second data sample.

At operation 1108, a third unrolled first-tap decision feedback equalization loop is configured in a circuit design, where the third unrolled first-tap decision feedback equalization loop is configured to generate a third data sample of a second input signal based on the second input signal, the first-tap coefficient (e.g., H1), a third clock signal (e.g., 90 degree clock signal), and a third first-tap feedback signal.

Likewise, at operation 1110, a fourth unrolled first-tap decision feedback equalization loop is configured in the circuit design, where the fourth unrolled first-tap decision feedback equalization loop is configured to generate a fourth data sample of the second input signal based on the second input signal, the first-tap coefficient, a fourth clock signal (e.g., 270 degree clock signal), and a fourth first-tap feedback signal. With operation 1112, a second second-tap decision feedback equalization loop is configured in the circuit design, where the second second-tap decision feedback equalization loop is configured to generate the second input signal based on the input data signal, the second-tap coefficient (e.g., H2), and at least one of the third data sample or the fourth data sample. For various embodiments, the first first-tap feedback signal comprises the fourth data sample from (e.g., generated by) the fourth unrolled first-tap decision feedback equalization loop, the second first-tap feedback signal comprises the third data sample from the third unrolled first-tap decision feedback equalization loop, the third first-tap feedback signal comprises the first data sample from the first unrolled first-tap decision feedback equalization loop, and the fourth first-tap feedback signal comprises the second data sample from the second unrolled first-tap decision feedback equalization loop.

Though not illustrated, the method 1100 can include an operation to further configure with edge sampling (e.g., edge detection), which can be used by a data receiver to perform clock recovery. For instance, a fifth, a sixth, a seventh, and an eighth unrolled first-tap decision feedback equalization loops are configured in the circuit design. The fifth unrolled first-tap decision feedback equalization loop can be configured to generate a first edge sample of the first input signal based on the first input signal (generated by the first second-tap decision feedback equalization loop configured at operation 1106), an edge first-tap coefficient (e.g., H1.5), a fifth clock signal (e.g., 45 degree clock signal), and a fifth first-tap feedback signal, where the fifth first-tap feedback signal comprises the fourth data sample from the fourth unrolled first-tap decision feedback equalization loop (configured by operation 1110).

The sixth unrolled first-tap decision feedback equalization loop can be configured to generate a second edge sample of the first input signal based on the first input signal (generated by the first second-tap decision feedback equalization loop configured at operation 1106), the edge first-tap coefficient, a sixth clock signal (e.g., 225-degree clock signal), and a sixth first-tap feedback signal, where the sixth first-tap feedback signal comprises the third data sample from the third unrolled first-tap decision feedback equalization loop (configured by operation 1108).

The seventh unrolled first-tap decision feedback equalization loop can be configured to generate a third edge sample of the second input signal based on the second input signal (generated by the second second-tap decision feedback equalization loop configured at operation 1112), the edge first-tap coefficient, a seventh clock signal (e.g., 135-degree clock signal), and a seventh first-tap feedback signal, where the seventh first-tap feedback signal comprises the first data sample from the first unrolled first-tap decision feedback equalization loop (configured by operation 1102).

The eighth unrolled first-tap decision feedback equalization loop can be configured to generate a fourth edge sample of the second input signal based on the second input signal (generated by the second second-tap decision feedback equalization loop configured at operation 1112), the edge first-tap coefficient, an eighth clock signal (e.g., 315 degree clock signal), and an eighth first-tap feedback signal, where the eighth first-tap feedback signal comprises the second data sample from the second unrolled first-tap decision feedback equalization loop (configured by operation 1104).

For some embodiments, the edge first-tap coefficient is the same as the one used by the first, the second, the third, and the fourth unrolled first-tap decision feedback equalization loops for data sampling.

Figure 12:
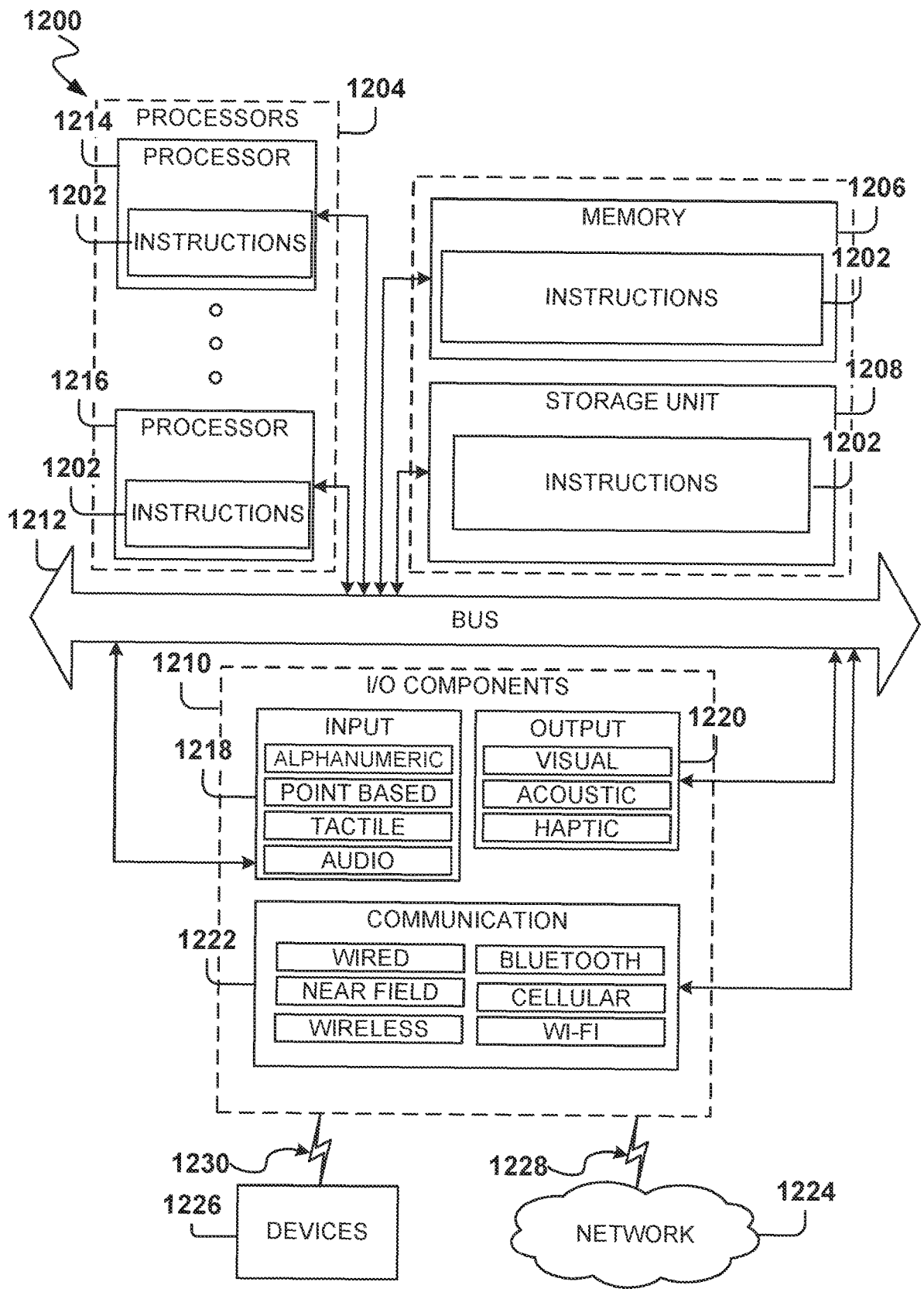
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a system within which instructions 1202 (e.g., software, a program, an application, an applet, an app, a driver, or other executable code) for causing the machine 1200 to perform any one or more of the methodologies discussed herein may be executed. For example, the instructions 1202 include executable code that causes the machine 1200 to execute the method 1100 described with respect to FIG. 11. In this way, these instructions 1202 transform the general, non-programmed machine 1200 into a particular machine programmed to carry out the described and illustrated method 1100 in the manner described herein. The machine 1200 may operate as a standalone device or may be coupled (e.g., networked) to other machines.

By way of non-limiting example, the machine 1200 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 1202, sequentially or otherwise, that specify actions to be taken by the machine 1200. Further, while only a single machine 1200 is illustrated, the term "machine" shall also be taken to include a collection of machines 1200 that individually or jointly execute the instructions 1202 to perform any one or more of the methodologies discussed herein.

The machine 1200 may include processors 1204, memory 1206, a storage unit 1208, and I/O components 1210, which may be configured to communicate with each other such as via a bus 1212. In an example embodiment, the processors 1204 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1214 and a processor 1216 that may execute the instructions 1202. The term "processor" is intended to include multi-core processors 1204 that may comprise two or more independent processors (sometimes referred to as "cores") that may execute instructions 1202 contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory 1206 (e.g., a main memory or other memory storage) and the storage unit 1208 are both accessible to the processors 1204 such as via the bus 1212. The memory 1206 and the storage unit 1208 store the instructions 1202 embodying any one or more of the methodologies or functions described herein. The instructions 1202 may also reside, completely or partially, within the memory 1206, within the storage unit 1208, within at least one of the processors 1204 (e.g., within the processor's cache memory), or any suitable combination thereof, during execution thereof by the machine 1200. Accordingly, the memory 1206, the storage unit 1208, and the memory of the processors 1204 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1202. The term "machine-readable medium" shall also be taken to include any medium, or combination of multiple media, that is capable of storing instructions (e.g., instructions 1202) for execution by a machine (e.g., machine 1200), such that the instructions, when executed by one or more processors of the machine (e.g., processors 1204), cause the machine to perform any one or more of the methodologies described herein (e.g., method 1100). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1210 may include a wide variety of components to receive input, provide output, produce output, transmit information, exchange information, capture measurements, and so on. The specific I/O components 1210 that are included in a particular machine 1200 will depend on the type of the machine 1200. For example, portable machines such as mobile phones will likely include a touch input device or other such input mechanisms, while a headless server machine will likely not include such a touch input device. It will be appreciated that the I/O components 1210 may include many other components that are not specifically shown in FIG. 12. The I/O components 1210 are grouped according to functionality merely for simplifying the following discussion and the grouping is in no way limiting. In various example embodiments, the I/O components 1210 may include input components 1218 and output components 1220. The input components 1218 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 1220 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1210 may include communication components 1222 operable to couple the machine 1200 to a network 1224 or devices 1226 via a coupling 1228 and a coupling 1230 respectively. For example, the communication components 1222 may include a network interface component or another suitable device to interface with the network 1224. In further examples, the communication components 1222 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1226 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Embodiments may be implemented in digital electronic circuitry, in computer hardware, firmware, or software, or in combinations of them. Embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 13:
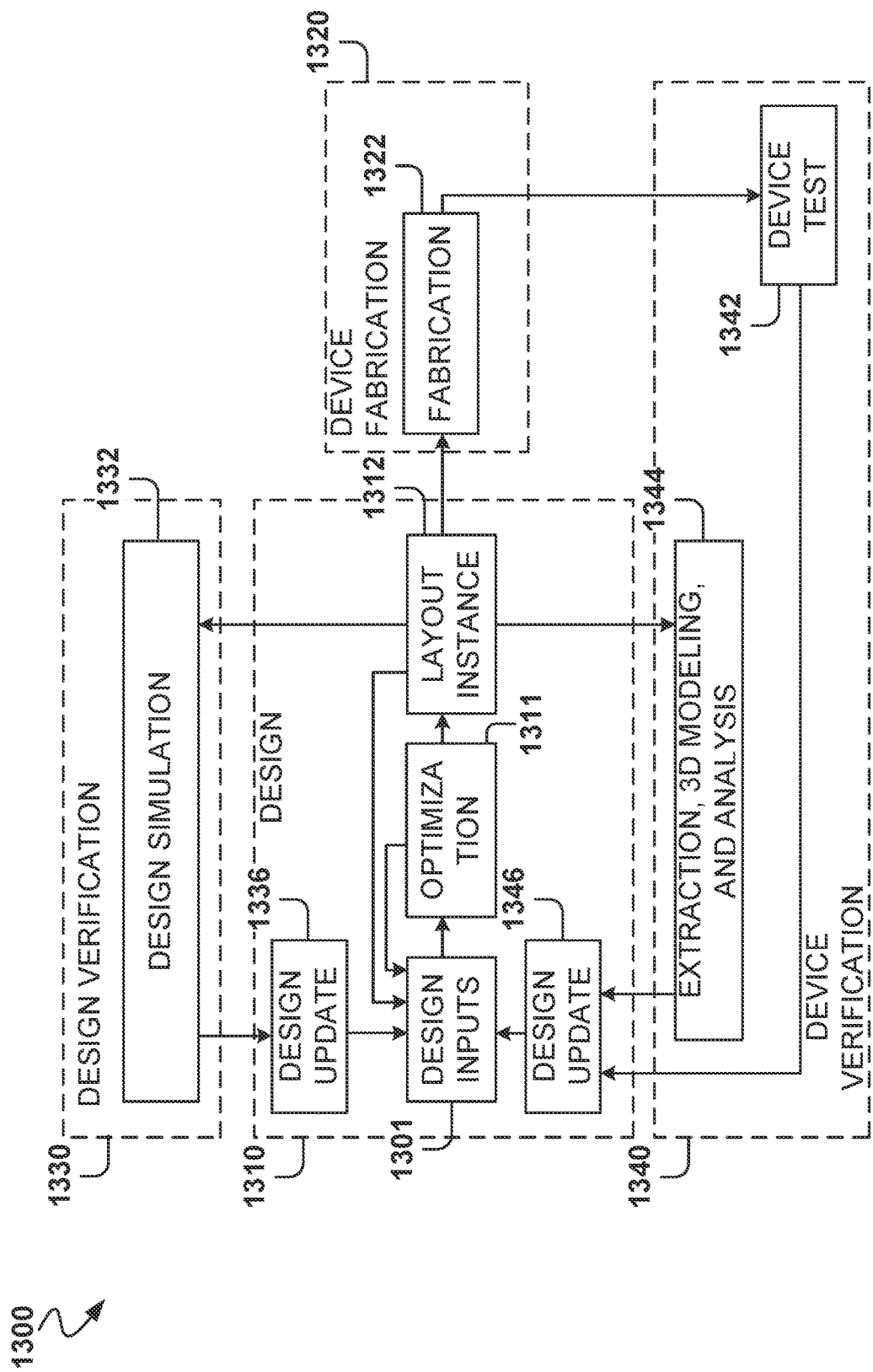
FIG. 13 is a diagram illustrating one possible design process flow for generating a circuit, including embodiments to implement quarter-rate data sampling with loop-unrolled decision feedback equalization as described herein, and in various embodiments, to integrate the circuit with a larger circuit.

FIG. 13 is a diagram illustrating one possible design process flow for generating a circuit, including embodiments to implement quarter-rate data sampling with loop-unrolled decision feedback equalization as described herein, and in various embodiments, to integrate the circuit with a larger circuit. As illustrated, the overall design flow 1300 includes a design phase 1310, a device fabrication phase 1320, a design verification phase 1330, and a device verification phase 1340. The design phase 1310 involves an initial design input operation 1301 where the basic elements and functionality of a device are determined, as well as revisions based on various analyses and optimization of a circuit design. This design input operation 1301 is where instances of an EDA circuit design file are used in the design and any additional circuitry is selected. The initial strategy, tactics, and context for the device to be created are also generated in the design input operation 1301, depending on the particular design algorithm to be used.

In some embodiments, following an initial selection of design values in the design input operation 1301, timing analysis and optimization according to various embodiments occurs in an optimization operation 1311, along with any other automated design processes. One such process may be the automated design of a partitioned root search for error locator polynomial functions in RS FEC decoding. As described below, design constraints for blocks of a circuit design generated with design inputs in the design input operation 1301 may be analyzed using hierarchical timing analysis, according to various embodiments. While the design flow 1300 shows such optimization occurring prior to a layout instance 1312, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 1322.

After design inputs are used in the design input operation 1301 to generate a circuit layout, and any optimization operations 1311 are performed, a layout is generated in the layout instance 1312. The layout describes the physical layout dimensions of the device that match the design inputs. This layout may then be used in the device fabrication operation 1322 to generate a device, or additional testing and design updates may be performed using designer inputs or automated updates based on design simulation 1332 operations or extraction, 3D modeling, and analysis 1344 operations. Once the device is generated, the device can be tested as part of device test 1342 operations, and layout modifications generated based on actual device performance.

As described in more detail below, design updates 1336 from the design simulation 1332, design updates 1346 from the device test 1342, the extraction, 3D modeling, and analysis 1344 operations, or the design input operation 1301 may occur after an initial layout instance 1312 is generated. In various embodiments, whenever design inputs are used to update or change an aspect of a circuit design, a timing analysis and optimization operation 1311 may be performed.

For example, in various embodiments, a user may provide an input to a computing device indicating placement of elements of a circuit within a portion of a circuit design, including description of circuitry for a multi-channel memory interface described herein. An output to a display of the computing device may show details of a circuit design, and may further be used to generate results of the timing analysis, or may show recommended optimizations or automatically performed adjustments to the circuit design based on the timing analysis. Further inputs to the computing device may involve adjustments as user design inputs, with additional timing analysis and optimization initiated via user operation of the computing device. In some embodiments, a computing device may be used to generate circuit design files describing circuitry corresponding to embodiments described herein. Such circuit design files may be used as outputs to generate photolithographic masks or other control files and components used to generate circuits that operate in accordance with various embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A circuit comprising:
a first unrolled first-tap decision feedback equalization loop configured to generate a first data sample of a first input signal based on the first input signal, a first-tap coefficient, a first clock signal, and a first first-tap feedback signal;
a second unrolled first-tap decision feedback equalization loop configured to generate a second data sample of the first input signal based on the first input signal, the first-tap coefficient, a second clock signal, and a second first-tap feedback signal;
a first second-tap decision feedback equalization loop configured to generate the first input signal based on an input data signal, a second-tap coefficient and at least one of the first data sample or the second data sample;
a third unrolled first-tap decision feedback equalization loop configured to generate a third data sample of a second input signal based on the second input signal; the first-tap coefficient, a third clock signal, and a third first-tap feedback signal;
a fourth unrolled first-tap decision feedback equalization loop configured to generate a fourth data sample of the second input signal based on the second input signal, the first-tap coefficient, a fourth clock signal, and a fourth first-tap feedback signal; and
a second second-tap decision feedback equalization loop configured to generate the second input signal based on the input data signal, the second-tap coefficient and at least one of the third data sample or the fourth data sample, the first first-tap feedback signal comprising the fourth data sample from the fourth unrolled first-tap decision feedback equalization loop, the second first-tap feedback signal comprising the third data sample from the third unrolled first-tap decision feedback equalization loop, the third first-tap feedback signal comprising the first data sample from the first unrolled first-tap decision feedback equalization loop, and the fourth first-tap feedback signal comprising the second data sample from the second unrolled first-tap decision feedback equalization loop.

2. The circuit of claim 1, wherein the first second-tap decision feedback equalization loop comprises:
a first multiplexer configured to receive the first data sample from the first unrolled first-tap decision feedback equalization loop, to receive the second data sample from the second unrolled first-tap decision feedback equalization loop, and to selectively output, based on a delayed version of the third clock signal, at least one of the first data sample or the second data sample as a first multiplexer Output signal;
a first second-tap logic configured to generate a first second-tap feedback signal based the second-tap coefficient and the first multiplexer output signal; and
a first summer configured to receive the input data signal, to receive the first second-tap feedback signal, and to generate the first input signal by applying the first second-tap feedback signal to the input data signal.

3. The circuit of claim 2, wherein the second second-tap decision feedback equalization loop comprises:
a second multiplexer configured to receive the third data sample from the third unrolled first-tap decision feedback equalization loop, to receive the fourth data sample from the fourth unrolled first-tap decision feedback equalization loop, and to selectively output, based on a delayed version of the second clock signal, at least one of the third data sample or the fourth data sample as a second multiplexer output signal;
a second second-tap logic configured to generate a second second-tap feedback signal based the second-tap coefficient and the second multiplexer output signal; and
a second summer configured to receive the input data signal, to receive the second second-tap feedback signal, and to generate the second input signal by applying the second second-tap feedback signal to the input data signal, the first summer and the second summer being configured to receive a similar programmable current.

4. The circuit of claim 1, wherein the first unrolled first-tap decision feedback equalization loop comprises:
a first data sampler configured to generate a first first-tap sample of the first input signal by sampling the first input signal based on the first clock signal while applying the first-tap coefficient with a first polarity;
a second data sampler configured to generate a second first-tap sample of the first input signal by sampling the first input signal based on the first clock signal applying the first-tap coefficient with a second polarity;
a first multiplexer configured to receive the first first-tap sample, to receive the second first-tap sample, and to selectively output, based on the first first-tap feedback signal, the first first-tap sample or the second first-tap sample as a first multiplexer output signal; and
a first latch configured to latch the first multiplexer output signal and provide the latched first multiplexer output signal as the first data sample of the first input signal.

5. The circuit of claim 4, wherein the input data signal comprises a differential pair of data signals.

6. The circuit of claim 4, wherein the first data sampler is calibrated using a multi-point calibration process, the multi-point calibration process comprising:
while applying zero volts to a data input port of the first data sampler, identifying a first corresponding digital code for adjusting a threshold voltage of the first data sampler to the zero volts;
while applying a positive target voltage to the data input port, identifying a second corresponding digital code for adjusting the threshold voltage of the first data sampler to the positive target voltage;
while applying a negative target voltage to the data input port, identifying a third corresponding digital code for adjusting the threshold voltage of the first data sampler to the negative target voltage;
determining a first slope based on the first corresponding digital code and the second corresponding digital code;
determining a second slope based on the first corresponding digital code and the third corresponding digital code; and
determining an offset for the first data sampler based on the first corresponding digital code.

7. The circuit of claim 1, further comprising:
a fifth unrolled first-tap decision feedback equalization loop configured to generate a first edge sample of the first input signal based on the first input signal, an edge first-tap coefficient, a fifth clock signal, and a fifth first-tap feedback signal, the fifth first-tap feedback signal comprising the fourth data sample from the fourth unrolled first-tap decision feedback equalization loop;
a sixth unrolled first-tap decision feedback equalization loop configured to generate a second edge sample of the first input signal based on the first input signal, the edge first-tap coefficient, a sixth clock signal, and a sixth first-tap feedback signal, the sixth first-tap feedback signal comprising the third data sample from the third unrolled first-tap decision feedback equalization loop;
a seventh unrolled first-tap decision feedback equalization loop configured to generate a third edge sample of the second input signal based on the second input signal, the edge first-tap coefficient, a seventh clock signal, and a seventh first-tap feedback signal, the seventh first-tap feedback signal comprising the first data sample from the first unrolled first-tap decision feedback equalization loop; and
an eighth unrolled first-tap decision feedback equalization loop configured to generate a fourth edge sample of the second input signal based on the second input signal, the edge first-tap coefficient, an eighth clock signal, and an eighth first-tap feedback signal, the eighth first-tap feedback signal comprising the second data sample from the second unrolled first-tap decision feedback equalization loop.

8. The circuit of claim 7, wherein the first clock signal is earlier than the fifth clock signal by a predetermined time interval, the second clock signal is earlier than the sixth clock signal by the predetermined time interval, the third clock signal is earlier than the seventh clock signal by the predetermined time interval, and the fourth clock signal is earlier than the eighth clock signal by the predetermined time interval.

9. The circuit of claim 7, wherein an individual loop, selected from the fifth, the sixth, the seventh, and the eighth unrolled first-tap decision feedback equalization loops, is disabled for edge sampling and is enabled for performing offset recalibration of at least one data sampler within the individual loop.

10. The circuit of claim 7, wherein an individual loop, selected from the fifth, the sixth, the seventh, and the eighth unrolled first-tap decision feedback equalization loops, is disabled for edge sampling and is enabled for performing a measurement task with respect to the input data signal.

11. The circuit of claim 10, wherein the individual loop comprises:
a plurality of data samplers; and
clock selection logic configured to:
provide the plurality of data samplers with an edge clock signal when the individual loop is enabled for edge sampling and disabled for performing the measurement task; and
provide the plurality of data samplers with a measurement clock signal when the individual loop is disabled for edge sampling and enabled for performing the measurement task.

12. The circuit of claim 11, wherein the first unrolled first-tap decision feedback equalization loop comprises a data sampler, the data sampler comprising:
a phase alignment circuit configured to align the measurement clock signal with a data clock signal that is used by one of the first, the second, the third, or the fourth unrolled first-tap decision feedback equalization loops corresponding to the individual loop, the alignment of the measurement clock signal with the data clock signal being performed prior to the measurement task being perform by the individual loop.

13. The circuit of claim 12, wherein the phase alignment circuit comprises an SR-Latch and a D-flip-flop.

14. The circuit of claim 10, wherein the individual loop is periodically calibrated while disabled for edge sampling.

15. The circuit of claim 10, wherein a voting strategy is applied on output generated by all other loops, from the fifth, the sixth, the seventh, and the eighth first-tap decision feedback equalization loops, that remain enabled for edge sampling.

16. The circuit of claim 10, wherein the measurement task comprises at least one of measuring eye amplitude or correlating amplitude with past bit values carried by the input data signal.

17. The circuit of claim 1, wherein the first unrolled first-tap decision feedback equalization loop comprises:
a first data sampler configured to generate a first first-tap sample of the first input signal by sampling the first input signal based on the first clock signal while applying the first-tap coefficient with a first polarity, the first data sampler comprising a first tri-state output configured to provide the first first-tap sample, the first tri-state output being controlled by the first first-tap feedback signal;
a second data sampler configured to generate a second first-tap sample of the first input signal by sampling the first input signal based on the first clock signal while applying the first-tap coefficient with a second polarity, the second data sampler comprising a second tri-state output configured to provide the second first-tap sample, the second tri-state output being controlled by an inverse of the first first-tap feedback signal; and
a regenerative latch portion coupled to the first tri-state output and the second tri-state output, the regenerative latch portion being configured to receive a sampler output signal from at least one of the first tri-state output or the second tri-state output, to latch the sampler output signal based on the first clock signal, to regenerate the latched sampler output signal, and to provide the regenerated latched sampler output signal.

18. The circuit of claim 1, wherein the first-tap coefficient applied used by the first and the second unrolled first-tap decision feedback equalization loops is different from the first-tap coefficient used by the third and the fourth unrolled first-tap decision feedback equalization loops, or wherein the second-tap coefficient used by the first second-tap decision feedback equalization loop is different from the second-tap coefficient used by the second second-tap decision feedback equalization loop.

19. A non-transitory computer-readable medium comprising instructions that, when executed by one or more processors of a computing device, cause the computing device to generate a circuit design by performing operations comprising:
configuring, in the circuit design, a first unrolled first-tap decision feedback equalization loop configured to generate a first data sample of a first input signal based on the first input signal, a first-tap coefficient, a first clock signal, and a first first-tap feedback signal;
configuring, in the circuit design, a second unrolled first-tap decision feedback equalization loop configured to generate a second data sample of the first input signal based on the first input signal, the first-tap coefficient, a second clock signal, and a second first-tap feedback signal;
configuring, in the circuit design, a first second-tap decision feedback equalization loop configured to generate the first input signal based on an input data signal, a second-tap coefficient and at least one of the first data sample or the second data sample;
configuring, in the circuit design, a third unrolled first-tap decision feedback equalization loop configured to generate a third data sample of a second input signal based on the second input signal, the first-tap coefficient, a third clock signal, and a third first-tap feedback signal;
configuring, in the circuit design, a fourth unrolled first-tap decision feedback equalization loop configured to generate a fourth data sample of the second input signal based on the second input signal, the first-tap coefficient, a fourth clock signal, and a fourth first-tap feedback signal; and
configuring, in the circuit design, a second second-tap decision feedback equalization loop configured to generate the second input signal based on the input data signal, the second-tap coefficient and at least one of the third data sample or the fourth data sample, the first first-tap feedback signal comprising the fourth data sample from the fourth unrolled first-tap decision feedback equalization loop, the second first-tap feedback signal comprising the third data sample from the third unrolled first-tap decision feedback equalization loop, the third first-tap feedback signal comprising the first data sample from the first unrolled first-tap decision feedback equalization loop, and the fourth first-tap feedback signal comprising the second data sample from the second unrolled first-tap decision feedback equalization loop.

20. A method comprising:
generating, by a first unrolled first-tap decision feedback equalization loop, a first data sample of a first input signal based on the first input signal, a first-tap coefficient, a first clock signal, and a first first-tap feedback signal;

generating, by a second unrolled first-tap decision feedback equalization loop, a second data sample of the first input signal based on the first input signal, the first-tap coefficient, a second clock signal, and a second first-tap feedback signal;

generating, by a first second-tap decision feedback equalization loop, the first input signal based on an input data signal, a second-tap coefficient and at least one of the first data sample or the second data sample;

generating, by a third unrolled first-tap decision feedback equalization loop, a third data sample of a second input signal based on the second input signal, the first-tap coefficient, a third clock signal, and a third first-tap feedback signal;

generating, by a fourth unrolled first-tap decision feedback equalization loop, a fourth data sample of the second input signal based on the second input signal, the first-tap coefficient, a fourth clock signal, and a fourth first-tap feedback signal; and generating, by a second second-tap decision feedback equalization loop, the second input signal based on the input data signal, the second-tap coefficient and at least one of the third data sample or the fourth data sample, the first first-tap feedback signal comprising the fourth data sample from the fourth unrolled first-tap decision feedback equalization loop, the second first-tap feedback signal comprising the third data sample from the third unrolled first-tap decision feedback equalization loop, the third first-tap feedback signal comprising the first data sample from the first unrolled first-tap decision feedback equalization loop, and the fourth first-tap feedback signal comprising the second data sample from the second unrolled first-tap decision feedback equalization loop.

* * * * *